United States Patent
Kim et al.

(10) Patent No.: US 9,467,970 B1
(45) Date of Patent: Oct. 11, 2016

(54) ROBUST ROUTING AND DELIVERY OF NOTIFICATIONS

(71) Applicant: PagerDuty, Inc., San Francisco, CA (US)

(72) Inventors: Owen Hee-chul Kim, Seattle, WA (US); Daniel Morrison Byrd, San Francisco, CA (US); Ashwin Maroti Jiwane, Nagpur (IN); John Gary Ryan Laban, Mississauga (CA); Andrew Gregory Miklas, San Francisco, CA (US); Paul James Rechsteiner, Toronto (CA); Kenneth Lloyd Patrick Rose, Toronto (CA); Eric William Sigler, San Francisco, CA (US)

(73) Assignee: PagerDuty, Inc., San Francisco, CA (US)

( * ) Notice: Subject to any disclaimer, the term of this patent is extended or adjusted under 35 U.S.C. 154(b) by 0 days.

(21) Appl. No.: 15/154,874

(22) Filed: May 13, 2016

Related U.S. Application Data

(60) Provisional application No. 62/162,561, filed on May 15, 2015.

(51) Int. Cl.
| | |
|---|---|
| *H04W 68/00* | (2009.01) |
| *H04L 29/08* | (2006.01) |
| *H04L 12/743* | (2013.01) |
| *H04L 12/28* | (2006.01) |
| *H04L 12/46* | (2006.01) |

(52) U.S. Cl.
CPC ........ *H04W 68/005* (2013.01); *H04L 12/2854* (2013.01); *H04L 12/4604* (2013.01); *H04L 45/7453* (2013.01); *H04L 67/1072* (2013.01); *H04L 67/30* (2013.01)

(58) Field of Classification Search
None
See application file for complete search history.

(56) References Cited

U.S. PATENT DOCUMENTS

| | | | | |
|---|---|---|---|---|
| 6,850,866 | B2 * | 2/2005 | Couchot | G06Q 30/02 702/182 |
| 2001/0037359 | A1 * | 11/2001 | Mockett | G06F 17/30867 709/203 |
| 2003/0187998 | A1 * | 10/2003 | Petit | H04L 63/102 709/229 |
| 2004/0168121 | A1 * | 8/2004 | Matz | G06F 17/30867 715/255 |
| 2005/0289264 | A1 * | 12/2005 | Illowsky | G06F 1/3203 710/104 |

(Continued)

FOREIGN PATENT DOCUMENTS

WO    WO 01/24084 A2 * 4/2001

OTHER PUBLICATIONS

Mazdek, Hashemi "Push our limits—reliability testing at Twitter" http://blog/twitter.com/2014/push-our-limits-reliability-testing-at-twitter, Sep. 2, 2014 8 pages.

*Primary Examiner* — Jenee Williams
(74) *Attorney, Agent, or Firm* — John W. Branch; Lowe Graham Jones PLLC

(57) ABSTRACT

Embodiments are directed towards a notification message system arranged to generate notification messages. Responsible resources may be determined based on the notification messages and a schedule. A plurality of message providers that have a provider profiles may be determined based on the responsible resources and a region. A message provider from the plurality of message providers may be determined based on its provider profile. The notification messages may be provided to the message provider so they can be provided to the responsible resources. The provider profiles may be updated based on performance metrics associated with the message provider.

28 Claims, 11 Drawing Sheets

(56) References Cited

U.S. PATENT DOCUMENTS

| | | | |
|---|---|---|---|
| 2006/0072523 A1* | 4/2006 | Richardson | H04L 65/1073 370/338 |
| 2006/0248479 A1* | 11/2006 | Hilbich | H04L 69/329 715/864 |
| 2008/0040501 A1* | 2/2008 | Harrang | H04L 1/0002 709/232 |
| 2008/0189350 A1* | 8/2008 | Vasa | H04L 12/2602 709/201 |
| 2008/0195664 A1* | 8/2008 | Maharajh | G06F 17/30035 |
| 2009/0100047 A1* | 4/2009 | Jones | G06F 17/30648 |
| 2009/0209349 A1* | 8/2009 | Padhye | H04L 67/101 463/42 |
| 2010/0023606 A1* | 1/2010 | Gerdes | H04L 67/16 709/221 |
| 2014/0256298 A1* | 9/2014 | Moss | H04W 4/12 455/414.1 |

\* cited by examiner

ROBUST ROUTING AND DELIVERY OF NOTIFICATIONS

CROSS-REFERENCE TO RELATED APPLICATIONS

This application is a Utility Patent application based on a previously filed U.S. Provisional Patent Application U.S. Ser. No. 62/162,561 filed on May 15, 2015, entitled "ROBUST ROUTING AND DELIVERY OF NOTIFICATIONS," the benefit of the filing date of which is hereby claimed under 35 U.S.C. §119(e) and which is further incorporated by reference in its entirety.

TECHNICAL FIELD

The present invention relates generally to computer automated scheduling and notification of resources and more particularly, but not exclusively to processing and validation of messages relating to events and notification.

BACKGROUND

Information technology has become an increasingly important and indispensable component required for the operation of most modern enterprises. This increased dependency on information technology often requires dedicated support resources be readily accessible to resolve planned or unplanned incidents that may affect the operation the information technology infrastructure. Accordingly, it may be important to identify the support resources that may be responsible for resolving the incidents. Likewise, it may be necessary to deliver notifications regarding these and other incidents to the appropriate support resources. For example, those persons and/or organizations that may be responsible for monitoring and/or resolving problems that may be associated with the incidents.

In some cases, support resources may be organized into one or more teams having one or more team members. At any given time, one or more team members may be responsible for providing support and/or responding to incidents for various portions of the information technology infrastructure. As information technology infrastructure increases in importance, complexity, and size, resources such as the number of support teams and/or support team members may increase as well. For such expansive and complex infrastructure, generating schedules for determining which resources may be responsible for responding to incidents may also be complex and difficult. Likewise, ensuring that the proper resources may be notified if incidents occur may be grow more complex and/or unreliable as the schedules become more complex. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Description of Various Embodiments, which is to be read in association with the accompanying drawings, wherein.

DETAILED DESCRIPTION OF THE EMBODIMENTS

Figure 1:
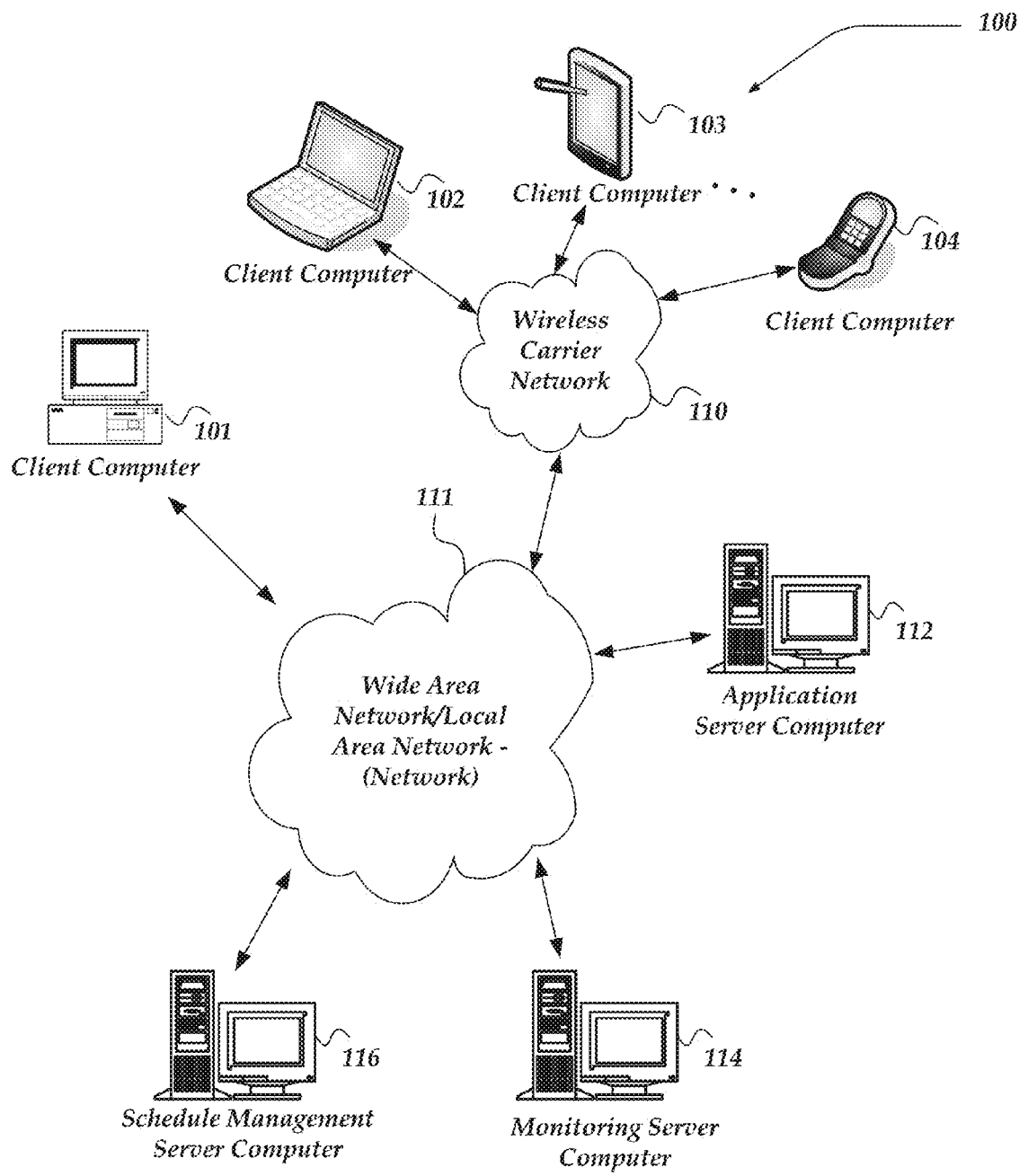
FIG. 1 shows components of one embodiment of an environment in which embodiments of the invention may be practiced.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

The term "resource" as used herein refers to a person or entity that may be responsible for responding to an event associated with a monitored application or service. For example, resources may be members of an information technology (IT) team providing support to employees of a company. Resources may be notified if an event they are responsible for handling at that time is encountered. In some embodiments, a scheduler application may be arranged to associate one or more resources with times that they are responsible for handling particular events (.e.g., times when they are on-call to maintain various IT services for a company). A resource that is determined to be responsible for handling a particular event may be referred to as a responsible resource. Responsible resources may be considered to be on-call and/or active during the period of time they are designated by the schedule to be available.

The term "resource address" as used herein refers to information used to communicate with a resource. For example, a resource address may be a telephone number, email address, SMS short code, Instant Messaging (IM) address, Uniform Resource Locator (URL), or the like. Configuration information may associate one or more resources addresses with one or more resources.

The term "event" as used herein refers one or more outcomes, conditions, or occurrences that may be detected or observed by event monitoring systems. Event monitoring systems may be configured to monitor various types of events depending on needs of an industry and/or technology area. For example, information technology services may generate events in response to one or more conditions, such as, computers going offline, memory overutilization, CPU overutilization, storage quotas being met or exceeded, applications failing or otherwise becoming unavailable, networking problems (e.g., latency, excess traffic, unexpected lack of traffic, intrusion attempts, or the like), electrical problems (e.g., power outages, voltage fluctuations, or the like), customer service requests, or the like, or combination thereof.

The term "event message" as used herein refers to one or more messages, emails, telephone calls, library function calls, application programming interface (API) calls, or any signals provided to a notification system indicating that an event was detected that may need to be brought to the attention of a resource. Third party systems may be arbitrarily configured to generate event messages that are provided to the notification system.

The term "synthetic event message," "synthetic notification message," or "synthetic traffic" as used herein refer to messages that may be self-generated by the system. Synthetic messages may be used for testing the performance of one or more message providers, service providers, or the like. Performance information derived monitoring the handling of synthetic messages may contribute to the information stored in a provider profile.

The term "notification message" as used herein refers to a communication provided by a notification system to a message provider for delivery to one or more responsible resources. A notification message may be used to inform one or more responsible resources that one or more event messages were received. For example, in at least one of the various embodiments, notification messages may be provided to the one or more responsible resources using SMS texts, MMS texts, email, Instant Messages, mobile device push notifications, HTTP requests, voice calls (telephone calls, Voice Over IP calls (VOIP), or the like), library function calls, API calls, URLs, audio alerts, haptic alert, any signals, or the like, or combination thereof.

The term "message provider" as used herein refers to a third party service provider that communicates one or more notification messages to one or more responsible resources. Message providers may communicate with one or more types of technologies, such as, SMS texts, MMS texts, email, Instant Messages (IM), push notifications, HTTP requests, voice calls, library function calls, audio alerts, haptic alerts, any signals, or the like, or combination thereof. A notification system may employ one or more message providers to at least communicate notification messages to the one or more responsible resources.

The term "service carrier" as used herein refers to communication carriers, such as, a wireless telephony carrier, wired telephony carrier, internet service provider, or the like, that one or more message providers may employ to communicate notification messages to computing devices associated with one or more responsible resources, e.g., client computers, mobile computers, network computers, or the like.

The terms "provider profile," or "provider performance profile" as used herein collectively represents one or more performance characteristics of a message provider. Various performance and/or reliability characteristics of a message provider may be measured. In some cases, the characteristics may be tracked by geographic region, time-of-day, type of message, service carrier, type of sending/receiving device, or the like, or combination thereof. Provider profiles of different message providers may be compared when selecting among one or more message providers and/or when ranking/scoring message providers against each other.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed towards a robust highly available notification message system. In at least one of the various embodiments, a notification system may be arranged to provide one or more notification messages.

In at least one of the various embodiments, one or more responsible resources may be provided based on the one or more notification messages. In at least one of the various embodiments, providing the responsible resources may include determining the responsible resources based on a schedule.

In at least one of the various embodiments, a region that is associated with the one or more responsible resources may be provided based on the resource address of the one or more responsible resources.

In at least one of the various embodiments, a plurality of message providers may be provided based on the responsible resources with each message provider associated with a provider profile. In at least one of the various embodiments, the plurality of message providers may also be provided based on a region. In at least one of the various embodiments, a region may be associated with a rank ordered list of message providers ordered by preference, where the first provider may be the most preferred message provider. For example, a message provider that is most likely to deliver notification messages within proscribed time defined in a service level agreement (SLA) may be the most preferred message provider. Further, in some embodiments, each region may be associated with a list of disfavored or otherwise "known bad" message providers. Among other things, this list may be used to exclude message providers that are unreliable.

In at least one of the various embodiments, a message provider from the plurality of message providers may be provided based on its provider profile and a resource address of the one or more responsible resources. In at least one of the various embodiments, providing the message provider may also be based on a comparison of a portion of the message provider's provider profile and a hash code of the resource address to determine the message provider.

In at least one of the various embodiments, the one or more notification messages may be provided to the message provider so the message provider may provide the one or more notification messages to the one or more responsible resources. Also, in some embodiments, message providers may be selected deterministically based on a defined priority order. In at least one of the various embodiments, message providers may be excluded from the selection process if they are known to be down or otherwise unreliable.

In at least one of the various embodiments, if the message provider fails to deliver the notification messages, another message provider may be provided using a selection method, such as, an ordered list of the plurality of message providers that excludes each message provider that failed to deliver the one or more notification messages.

In at least one of the various embodiments, the provider profiles may be updated based on one or more performance metrics associated with the message provider. In at least one of the various embodiments, the provider profile may include, weight values, one or more proportional weight values, one or more performance metrics, one or more regions, delivery costs, delivery success history, delivery error history, or the like.

In at least one of the various embodiments, end-to-end testing may performed by generating synthetic messages that may be provided to control resources and control devices using the message providers and service carriers that are associated with the control resources and/or control devices.

Illustrated Operating Environment

FIG. 1 shows components of one embodiment of an environment in which the invention may be practiced. Not all the components may be required to practice various embodiments, and variations in the arrangement and type of the components may be made. As shown, system 100 of FIG. 1 includes local area networks ("LANs")/wide area networks ("WANs")—(network) 111, wireless network 110, client computers 101-104, application server 112, monitoring server 114, and schedule manager server 116.

Generally, client computers 102-104 may include virtually any portable computing device capable of receiving and sending a message over a network, such as network 111, wireless network 110, or the like. Client computers 102-104 may also be described generally as client computers that are configured to be portable. Thus, client computers 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDA's), handheld computers, laptop computers, wearable computers, tablet computers, integrated devices combining one or more of the preceding devices, or the like. As such, client computers 102-104 typically range widely in terms of capabilities and features. For example, a cell phone may have a numeric keypad and a few lines of monochrome Liquid Crystal Display (LCD) on which only text may be displayed. In another example, a web-enabled mobile device may have a touch sensitive screen, a stylus, and several lines of color LCD in which both text and graphics may be displayed.

Client computer 101 may include virtually any computing device capable of communicating over a network to send and receive information, including messaging, performing various online actions, or the like. The set of such devices may include devices that typically connect using a wired or wireless communications medium such as personal computers, multiprocessor systems, microprocessor-based or programmable consumer electronics, network Personal Computers (PCs), or the like. In one embodiment, at least some of client computers 102-104 may operate over wired and/or wireless network. Today, many of these devices include a capability to access and/or otherwise communicate over a network such as network 111 and/or even wireless network 110. Moreover, client computers 102-104 may access various computing applications, including a browser, or other web-based application.

In one embodiment, one or more of client computers 101-104 may be configured to operate within a business or other entity to perform a variety of services for the business or other entity. For example, client computers 101-104 may be configured to operate as a web server, an accounting server, a production server, an inventory server, or the like. However, client computers 101-104 are not constrained to these services and may also be employed, for example, as an end-user computing node, in other embodiments. Further, it should be recognized that more or less client computers may be included within a system such as described herein, and embodiments are therefore not constrained by the number or type of client computers employed.

A web-enabled client computer may include a browser application that is configured to receive and to send web pages, web-based messages, or the like. The browser application may be configured to receive and display graphics, text, multimedia, or the like, employing virtually any web-based language, including a wireless application protocol messages (WAP), or the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, or the like, to display and send a message. In one embodiment, a user of the client computer may employ the browser application to perform various actions over a network.

Client computers 101-104 also may include at least one other client application that is configured to receive and/or send data, including budgeting and forecasting information, between another computing device. The client application may include a capability to provide requests and/or receive data relating to managing, operating, or configuring the schedule manager server 114. In some embodiments, the client application may employ processes such as described below in conjunction with FIGS. 9-15 to perform at least some of its actions.

Wireless network 110 is configured to couple client computers 102-104 and its components with network 111. Wireless network 110 may include any of a variety of wireless sub-networks that may further overlay stand-alone ad-hoc networks, or the like, to provide an infrastructure-oriented connection for client computers 102-104. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), 4th (4G), 5th (5G) generation radio access for cellular systems, WLAN, Wireless Router (WR) mesh, or the like. Access technologies such as 2G, 3G, 4G, and future access networks may enable wide area coverage for mobile devices, such as client computers 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), or the like. In essence, wireless network 110 may include virtually any wireless communication mechanism by which information may travel between client computers 102-104 and another computing device, network, or the like.

Network 111 is configured to couple network devices with other computing devices, including, schedule manager server 116, monitoring server 114, application server 112, client computer(s) 101, and through wireless network 110 to client computers 102-104. Network 111 is enabled to employ any form of computer readable media for communicating information from one electronic device to another. Also, network 111 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. For example, various Internet Protocols (IP), Open Systems Interconnection (OSI) architectures, and/or other communication protocols, architectures, models, and/or standards, may also be employed within network 111 and wireless network 110. Furthermore, remote computers and other related electronic devices could be remotely connected to either LANs or WANs via a modem and temporary telephone link. In essence, network 111 includes any communication method by which information may travel between computing devices.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media. Such communication media is distinct from, however, computer-readable devices described in more detail below.

Figure 3:
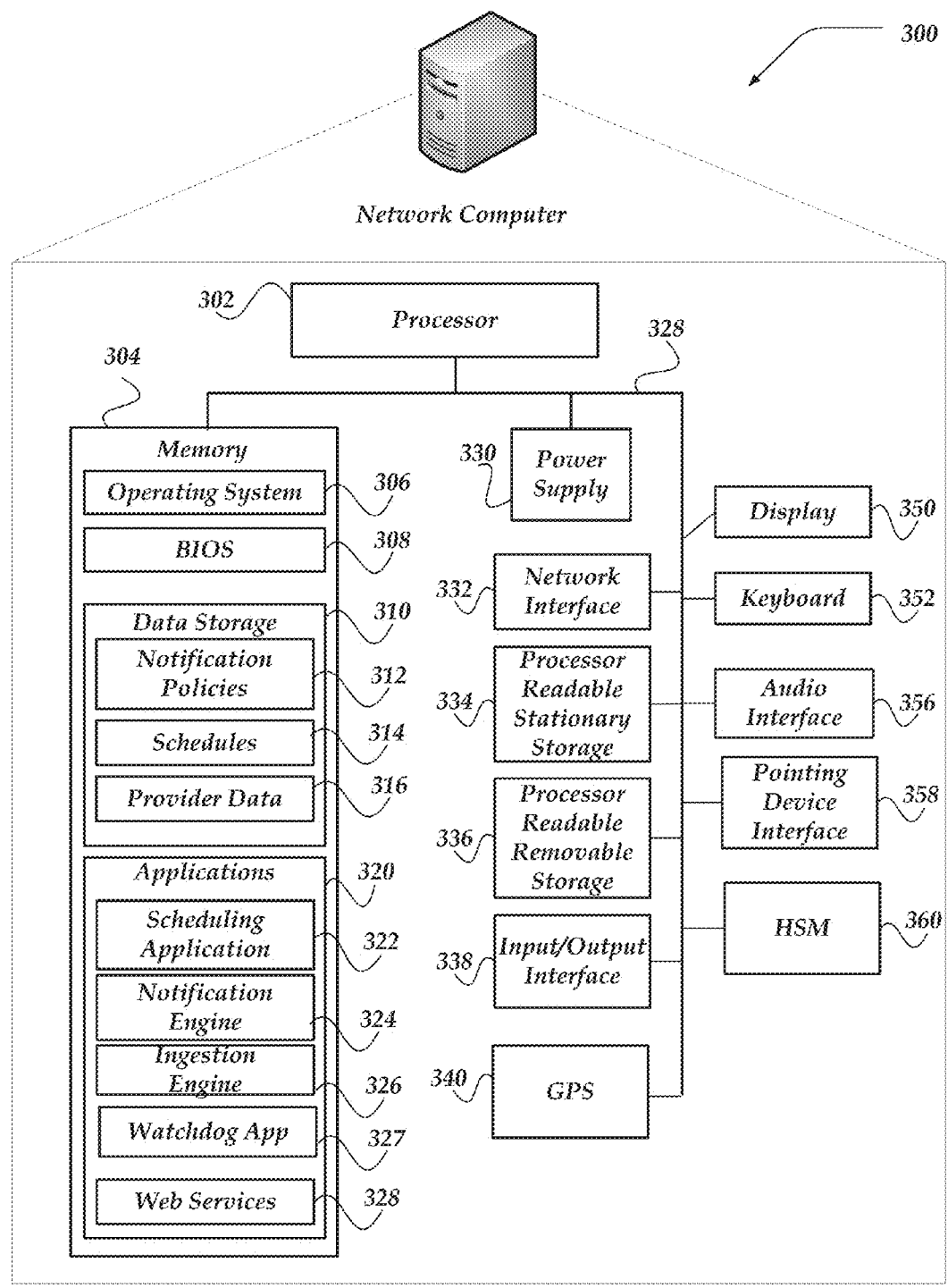
FIG. 3 shows one embodiment of a network computer, in accordance with at least one of the various embodiments.

Schedule manager server 116 may include virtually any network computer usable to provide schedule management services, such as network computer 300 of FIG. 3. In one embodiment, schedule manager server 116 employs various techniques for generation of resource schedules and notification policies. Schedule manager server 116 may be operative to perform notifications based on one or more notification rules and/or policies. Also, schedule manager server 116 may be arranged to interface/integrate with one or more external systems such as telephony carriers, email systems, web services, or the like, to send notifications relating to scheduling and/or incidents. In some cases, incidents may be generated based on communication from one or more monitoring systems, such as monitoring server 114.

Devices that may operate as schedule manager server 116 include various network computers, including, but not limited to personal computers, desktop computers, multiprocessor systems, microprocessor-based or programmable consumer electronics, network PCs, server devices, network appliances, or the like. It should be noted that while schedule manager server 116 is illustrated as a single network computer, the invention is not so limited. Thus, schedule manager server 116 may represent a plurality of network computers. For example, in one embodiment, schedule manager server 116 may be distributed over a plurality of network computers and/or implemented using cloud architecture.

Moreover, schedule manager server 116 is not limited to a particular configuration. Thus, schedule manager server 116 may operate using a master/slave approach over a plurality of network computers, within a cluster, a peer-to-peer architecture, and/or any of a variety of other architectures. Thus, schedule manager server 116 is not to be construed as being limited to a single environment, and other configurations, and architectures are also contemplated. Schedule manager server 116 may employ processes such as described below in conjunction with at some of the figures discussed below to perform at least some of its actions.

Illustrative Client Computer

Figure 2:
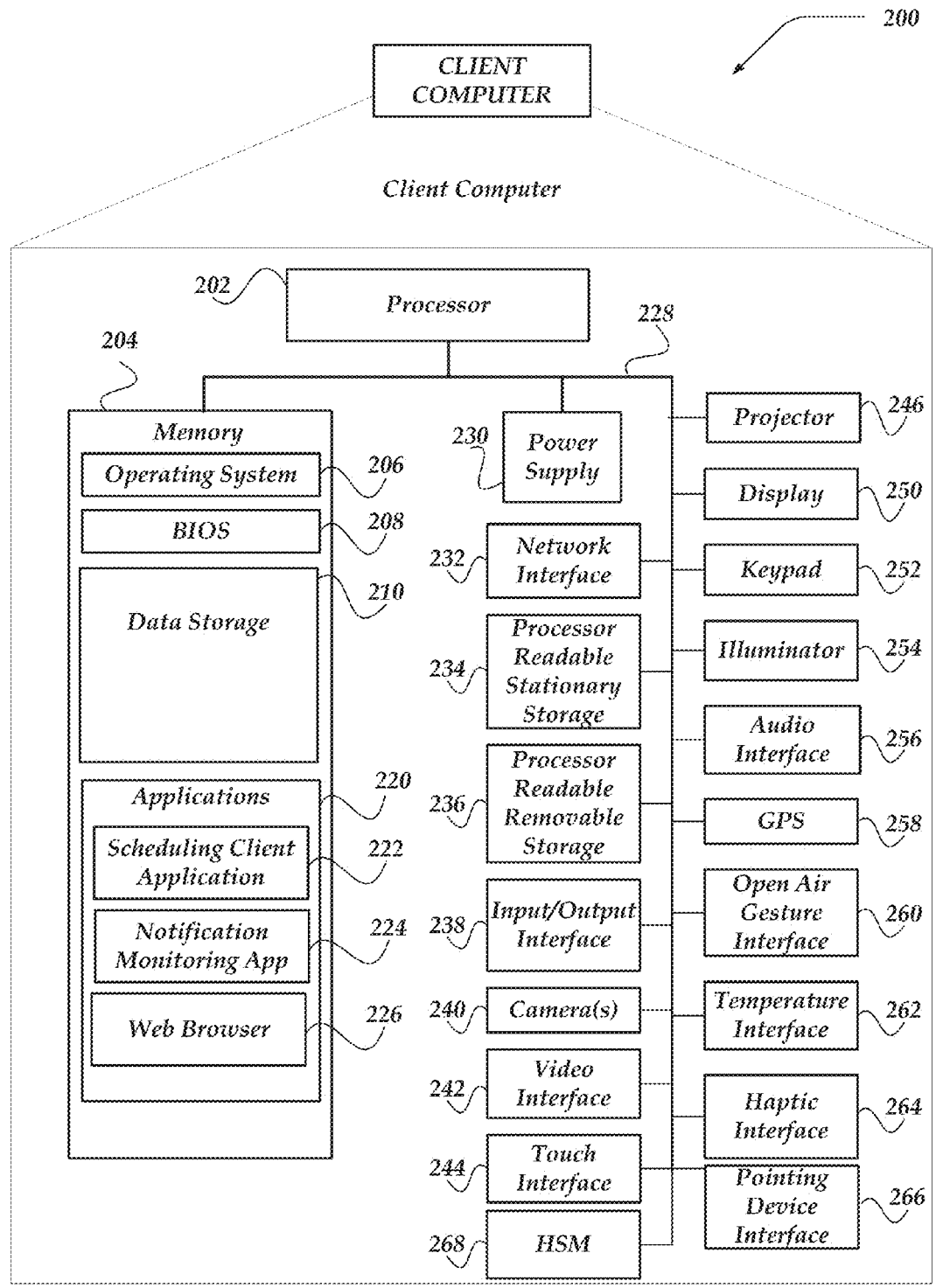
FIG. 2 shows one embodiment of a client computer that may be included in a system in accordance with at least one of the various embodiments.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring and/or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements and/or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others and/or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch and/or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication and/or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing and/or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, and/or store keys pairs, or the like. In some embodiments, HSM 268 may be a standalone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect and/or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input and/or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In at least one embodiment, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input and/or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, and/or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components and/or operating system operations via Java application programs.

Memory 204 may further include one or more data storage 210, which can be utilized by client computer 200 to store, among other things, applications 220 and/or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, and/or otherwise process instructions and data. Applications 220 may include, for example, scheduling client application 222 and notification monitoring application 224. In at least one of the various embodiments, scheduling client application 222 and notification monitoring application 224 may be used to exchange communications to and from schedule management server computer 116, monitoring server computer 114, application server computer 112, or the like. Exchanged communications may include, but are not limited to, queries, searches, messages, notification messages, event messages, alerts, performance metrics, log data, API calls, or the like, combination thereof.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

Illustrative Network Computer

FIG. 3 shows one embodiment of network computer 300 that may be included in a system implementing at least one of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of schedule management server computer 116, monitoring server computer(s) 114, or application server computer(s) 112 of FIG. 1.

As shown in the figure, network computer 300 includes a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Realtime Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others and/or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. Display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect and/or measure data that is external to network computer 300. Human interface components can be physically separate from network computer 300, allowing for remote input and/or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geopositioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In at least one embodiment, however, network computer 300 may, through other components, provide other information that may be employed to determine a physical location of the client computer, including for example, a Media Access Control (MAC) address, IP address, and the like.

Memory 304 may include Random Access Memory (RAM), Read-Only Memory (ROM), and/or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components and/or operating system operations via Java application programs. Likewise, other runtime environments may be included.

Memory 304 may further include one or more data storage 310, which can be utilized by network computer 300 to store, among other things, applications 320 and/or other data. For example, data storage 310 may also be employed to store information that describes various capabilities of network computer 300. The information may then be provided to another device or computer based on any of a variety of methods, including being sent as part of a header during a communication, sent upon request, or the like. Data storage 410 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, notification policies 312, schedules 314, provider data 316, or the like. Notification policies 312 may contain various rules and/or configuration information related to one or more notification policies that may be employed, or the like. Schedules 314 may contain scheduling information, as well as, other supporting data, arranged in lists, databases, configuration files, or the like. Also, provider data 316 may include configuration information, integration information, performance metrics, provider profiles, or the like, or combination thereof, for one or more message service providers.

Applications 320 may include computer executable instructions which, when executed by network computer 300, transmit, receive, and/or otherwise process messages (e.g., SMS, Multimedia Messaging Service (MMS), Instant Message (IM), email, and/or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include scheduling application 322, notification engine 324, ingestion engine 326, or watchdog application 327 that perform actions further described below. In at least one of the various embodiments, one or more of the applications may be implemented as modules and/or components of another application. Further, in at least one of the various embodiments, applications may be implemented as operating system extensions, modules, plugins, or the like.

Furthermore, in at least one of the various embodiments, scheduling application 322, notification engine 324, ingestion engine 326, or watchdog application 327 may be operative in a cloud-based computing environment. In at least one of the various embodiments, these applications, and others, that comprise the management platform may be executing within virtual machines and/or virtual servers that may be managed in a cloud-based based computing environment. In at least one of the various embodiments, in this context the applications may flow from one physical network computer within the cloud-based environment to another depending on performance and scaling considerations automatically managed by the cloud computing environment. Likewise, in at least one of the various embodiments, virtual machines and/or virtual servers dedicated to scheduling application 322, notification engine 324, ingestion engine 326, or watchdog application 327 may be provisioned and de-commissioned automatically.

Also, in at least one of the various embodiments, scheduling application 322, notification engine 324, ingestion engine 326, or watchdog application 327, or the like, may located in virtual servers running in a cloud-based computing environment rather than being tied to one or more specific physical network computers.

Further, network computer 300 may also comprise hardware security module (HSM) 360 for providing additional tamper resistant safeguards for generating, storing and/or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, and/or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), the network computer may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

Illustrative Logical System Architecture

Figure 4:
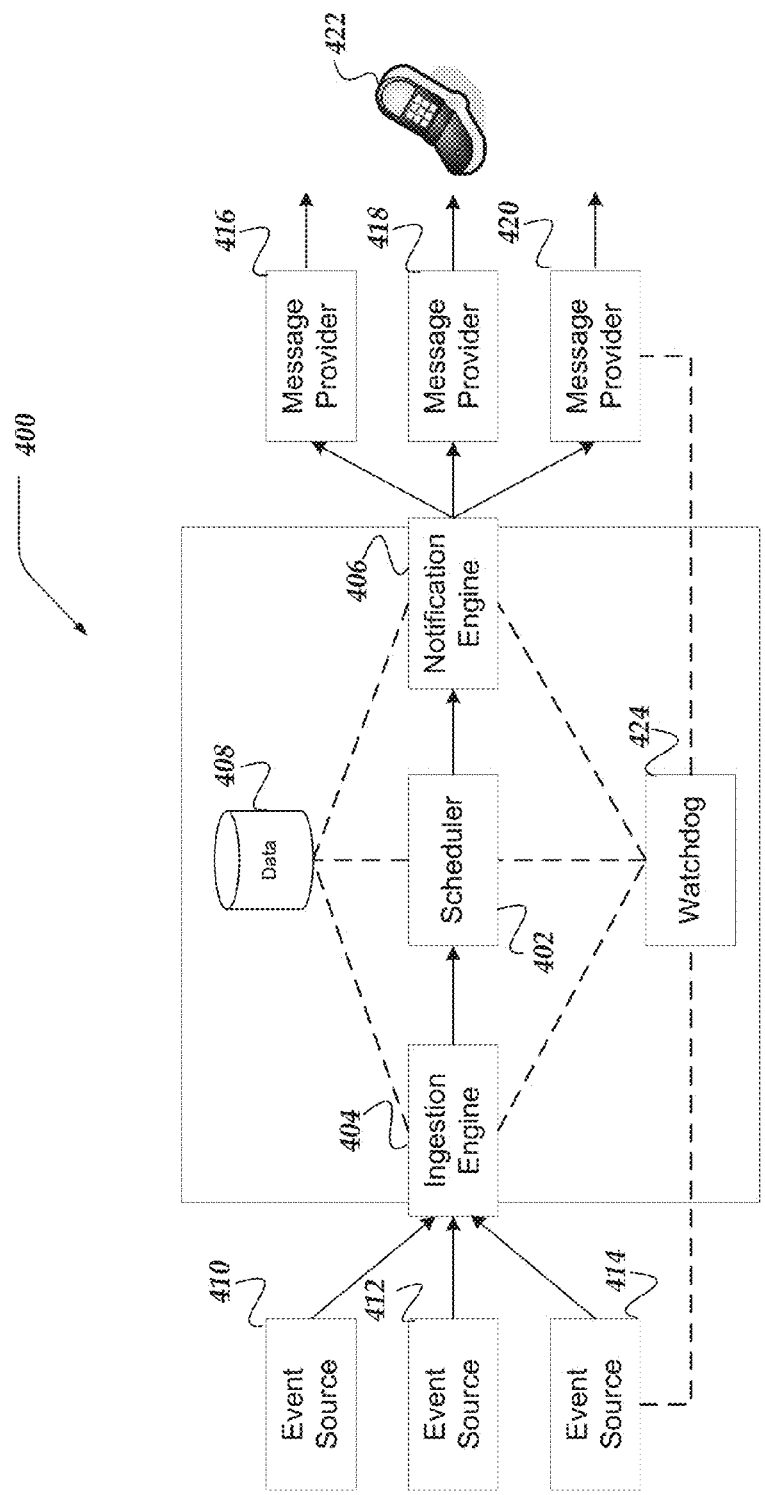
FIG. 4 illustrates a logical architecture of a system that provides robust high availability message routing in accordance with at least one of the various embodiments.

FIG. 4 illustrates a logical architecture of system 400 that provides high availability message routing in accordance with at least one of the various embodiments. In at least one of the various embodiments, system 400 may be arranged to be provided one or more event messages from one or more event sources. In response to the one or more event messages, system 400 may generate one or more notification messages and route them to a determined responsible resource. For example, in at least one of the various embodiments, system 400 may be provided system status/update event messages that may be associated with alarm conditions, failures, or the like, from one or more external operations. System 400 may determine one or more responsible resources, such as, one or more information technology (IT) staff members who may be configured to be provided notifications associated with the event messages. Accordingly, system 400 may be arranged to generate notification messages and provide them to the responsible resources. In at least one of the various embodiments, the particular responsible resources may be determined based on the type of event message and/or an on-call schedule that may be employed to identify the responsible persons that should be notified.

In at least one of the various embodiments, scheduler 402 may be arranged to be provided event messages from ingestion engine 404. In at least one of the various embodiments, scheduler 402 may be arranged to determine one or more resources (e.g., administrators, or the like) the may be responsible for handling the event messages.

In at least one of the various embodiments, notification engine 406 may be arranged to generate notification message for the responsible users and select the messaging provider that may be used to deliver the notification message to the responsible resource. In at least one of the various embodiments, database 408 may be arranged to store performance metrics, provider profiles, configuration information, or the like, for system 400.

In at least one of the various embodiments, event sources, such as, event source 410, event source 412, or event source 414 may be services and/or applications that may generate event messages that are provided to ingestion engine 404 of system 400. Event sources may be an error reporting system that generates event messages if some kind of problem or anomaly may be detected. The particular conditions that trigger events may vary depending on the application/service and its configured policies. For example, an ecommerce provider may generate event messages if customers are having difficulties reaching a payment service, or the like. Such event messages may be provided to ingestion engine 404 which may (or may not) manipulate and/or modify the event message format before providing them to scheduler 402.

In at least one of the various embodiments, scheduler 402 may determine which resource is responsible for handling the event message based on at least an on-call schedule and/or the content of the event message. Next, notification engine 406 may generate one or more notification messages and determine a particular message providers to use to send the notification message. Accordingly, the selected message providers, such as, message provider 416, message provider 418, or message provider 420, may communicate the notification message to the responsible resource perhaps by sending it mobile computer 422. In some embodiments, the message providers may generate an acknowledgment message that may be provided to system 400 that indicates delivery of the notification message.

In at least one of the various embodiments, notification engine 406 may determine the message provider based on a variety of considerations, such as, geography, reliability, quality-of-service, user/customer preference, type of notification message (e.g., SMS or Push Notification, or the like), cost of delivery, or the like, or combination thereof. In at least one of the various embodiments, various performance characteristics of each message provider may be stored and/or associated with a corresponding provider performance profile. Provider performance profiles may be arranged to represent the various metrics that may be measured for a provider. Also, provider profiles may include preference values and/or weight values that may be configured rather than measured, In at least one of the various embodiments, message providers may be third-party message services that offer bulk and/or high-capacity delivery of messages, such as, SMS, email, or the like. Message providers may be associated with one or more telephony carriers (e.g., wireless telephone services, telephone service companies, or the like) that may have affinities with different geographic regions. In some cases, message providers may support message delivery to some countries or regions and not others. Accordingly, in at least one of the various embodiments, notification engine 406 may be arranged to select one or more message providers that is enabled to deliver/provide messages to region where the target resource is located. For example, if a target resource is located in the country India, notification engine 406 may be arranged to select a message provider that provides service to India. In some cases, a message provider may support many regions while others may support one or a few. Also, message providers may be selected based on their reliability, customer preferences, price, and so on, for a given target region. In general, the properties used for selecting/comparing message providers may be stored in their associated provider profile.

In at least one of the various embodiments, watchdog 424 may be arranged to provide real-time monitoring and/or testing of features provided by system 400. Watchdog 424 may be a computer application that is arranged to deterministically generate synthetic event messages that may be tracked through the system all the way to the generation, receipt, and acknowledgement of notification messages.

In at least one of the various embodiments, synthetic event messages generate communications and/or notifications that are not provided to customers or users of a notification system. In at least one of the various embodiments, a notification system may be arranged to provide synthetic event messages to another system that may be arranged to receive the synthetic event messages and send replies back to the notification system as though it were a user.

In at least one of the various embodiments, watchdog 424 may also be arranged to passively monitor one or more delivery metrics of real event messages. Accordingly, performance anomalies may be detected and reported. In at least one of the various embodiments, watchdog 424 may be arranged to test, verify, and/or monitor the performance of the one or more message providers. Information developed from watchdog information/monitoring may be employed by notification engine 406 as part of determining which message provider to select for delivery notification messages. Accordingly, in at least one of the various embodiments, information collected by watchdog 424 may be used in part to update one or more properties of a message provider's provider profile.

In at least one of the various embodiments, watchdog 424 may be arranged to perform end-to-end message provider testing. In such cases, one or more client computers, such as, mobile computer 422 associated with particular message providers and/or wireless carriers, may be dedicated to receiving test notification messages generate on behalf of watchdog 424. These dedicated mobile computer may be arranged to include a client application, such as, notification monitoring application 224 that may collect metrics that may be reported to watchdog 424. In at least one of the various embodiments, watchdog 424 may periodically test the reliability of different wireless carriers by generating event messages the produce notifications that are provided to mobile computer associated with each wireless carrier. Accordingly, in at least one of the various embodiments, this information collected by watchdog 424 may be used in part to update one or more properties of a message provider's provider profile.

In some embodiments, the message provider may contact the notification system using one or more callback mechanisms to indicate if it fails to deliver a notification message or once it has delivered a notification message to the intended user. Some providers may be unable to trace delivery all the way to the user, in which case they may execute their callbacks once the notification message gets as far as they can trace. In at least one of the various embodiments, some client devices, such as, mobile computers, client computers, or the like, may be running applications, such as, scheduling client application 222, notification monitoring application 224, or the like. In such cases, the client application may be arranged to execute a callback to one or more server components, such as, scheduling application 322, notification engine 324, watchdog application 327, or the like, if notification messages are received by the client device. Accordingly, the server applications may be arranged to measure the metrics related to the delivery (e.g., latency) and provide information that may be used in a provider profile for the message provider.

In at least one of the various embodiments, some message providers may enable polling for obtaining status information or other metrics for a given message. Accordingly, in some embodiments, status information, metrics, or the like, related to message may be obtained by polling those message providers that prefer to use polling over callbacks. For example, in some embodiments, scheduling application 322, notification engine 324, watchdog application 327, or the like, may be arranged check in every X seconds to determine the status of a given message by sending a request to a message provider's polling APIs. In some embodiments, the particular time period for polling may be provided by or based on configuration information.

In at least one of the various embodiments, similarly, some message providers may provide callbacks just if the message delivery fails. Accordingly, in some embodiments, if a callback is received within a configurable period of time, the message may be considered to be delivered. Likewise, if callback is not provided within that configurable period of time, the message delivery may be considered a success. In at least one of the various embodiments, such methods may be sufficient to develop effective provider profiles for message providers for regions that may get a lot of real user traffic and/or provide callback that are far enough along the delivery process that result in a high confidence of the time when a message was actually delivered to the intended user or client device.

However, in some embodiments, there may be several region/provider pairs that have low traffic or non-information callbacks. Accordingly, for at least these message providers, synthetic message traffic may be generated to ensure that there may be enough traffic directed to any region/provider pair to enable the development of effective up-to-date provider profiles.

In at least one of the various embodiments, synthetic event messages may be provided to one or more user client devices/computers. In at least one of the various embodiments, synthetic event traffic provided to client devices running scheduling client application 222, notification monitoring application 224, or the like, may generate the same callbacks to the server applications as though they were real event messages, except they would not be displayed to the user. Accordingly, message provider performance profiles may be developed without using dedicated test hardware for every region/carrier combination. In at least one of the various embodiments, the user of the client device may be asked for consent to participate in such message provider profiling actions. Also, in some embodiments, the notification system may be arranged to monitor the distribution of synthetic event messages to avoid overly burdening any one user's client device.

In at least one of the various embodiments, if a notification message fails delivering, it may be difficult to distinguish user error, such as, as someone putting in a bad phone number from actual message provider system problem for the purposes of maintain message provider profiles. Accordingly, in at least one of the various embodiments, failures to deliver to an address that has not been used in a long time (or never) as "less bad" than a failure to deliver to an address that has been delivered to successfully many times recently. Note, in some embodiments, a long time may be defined using configuration information.

In at least one of the various embodiments, the relative ordering of message providers may be done in many dimensions, such as, latency and reliability, and may be constantly changing. Also, in some embodiments, a provider's relative ordering may vary according to region—the best provider for one region might be the worst for another. Thus, information may constantly be gathered to use when making optimization decisions.

In at least one of the various embodiments, this may be especially important if optimizing for latency. For example, ensuring that notifications are delivered under one or more service level agreements (SLA) that may be in place. In some embodiments, if the primary provider for a region stops working correctly, another message provider may need to be promoted to cover the same region and to minimize customer disruption.

In at least one of the various embodiments, provider profiling information may be gathered from two main sources: the providers themselves and client devices. In some embodiments, data provided by message providers may be useful, but it may not be always available and/or it may not be accurate. Further, in some embodiments, data provided by the message providers may not extend all the way to the client device.

In at least one of the various embodiments, client provided data may be primarily sourced in at least three ways. In some embodiments, client device provided data may be collected using system owned client devices. The system owned devices may be provided synthetic traffic by the system. This may provide a large amount of high quality data useful for generating accurate metrics. However, maintaining enough system owned client devices to provide adequate coverage may be expensive since system owned devices would be needed in every region on all service providers for all message providers.

Alternatively, in some embodiments, user/customer client devices may be instrumented to report back on "normal" traffic. Data provided by these client devices may be highly representative of the actual operation environment, but depending on the provider selection process, there may be blind-spots in the provided data. Accordingly, in at least one of the various embodiments, a "two phase" delivery approach may be used to gather performance data while still keeping notification message deliveries within any SLAs (e.g., optimize on meeting SLA requirements while also prioritizing on data gathering).

In at least one of the various embodiments, it may take an unacceptably long time to detect a problem with a message provider. At least one limitation of using real traffic to detect problems is that malfunctioning message providers may be removed after they have already failed to deliver some number of notification messages. Accordingly, if the SLAs are flexible enough and you have enough backup provider coverage for the region, the system may failover to a different message provider in time. But in some cases, if message providers are not operating within defined standards, it may be preferable to identify those message providers as soon as possible rather than after they have failed to deliver some number of notifications messages.

In some embodiments, instrumenting real user/customer client devices enable them to report performance metrics information based on synthetic traffic. In some embodiments, these performance metrics may be used to construct provider profiles.

Figure 5:
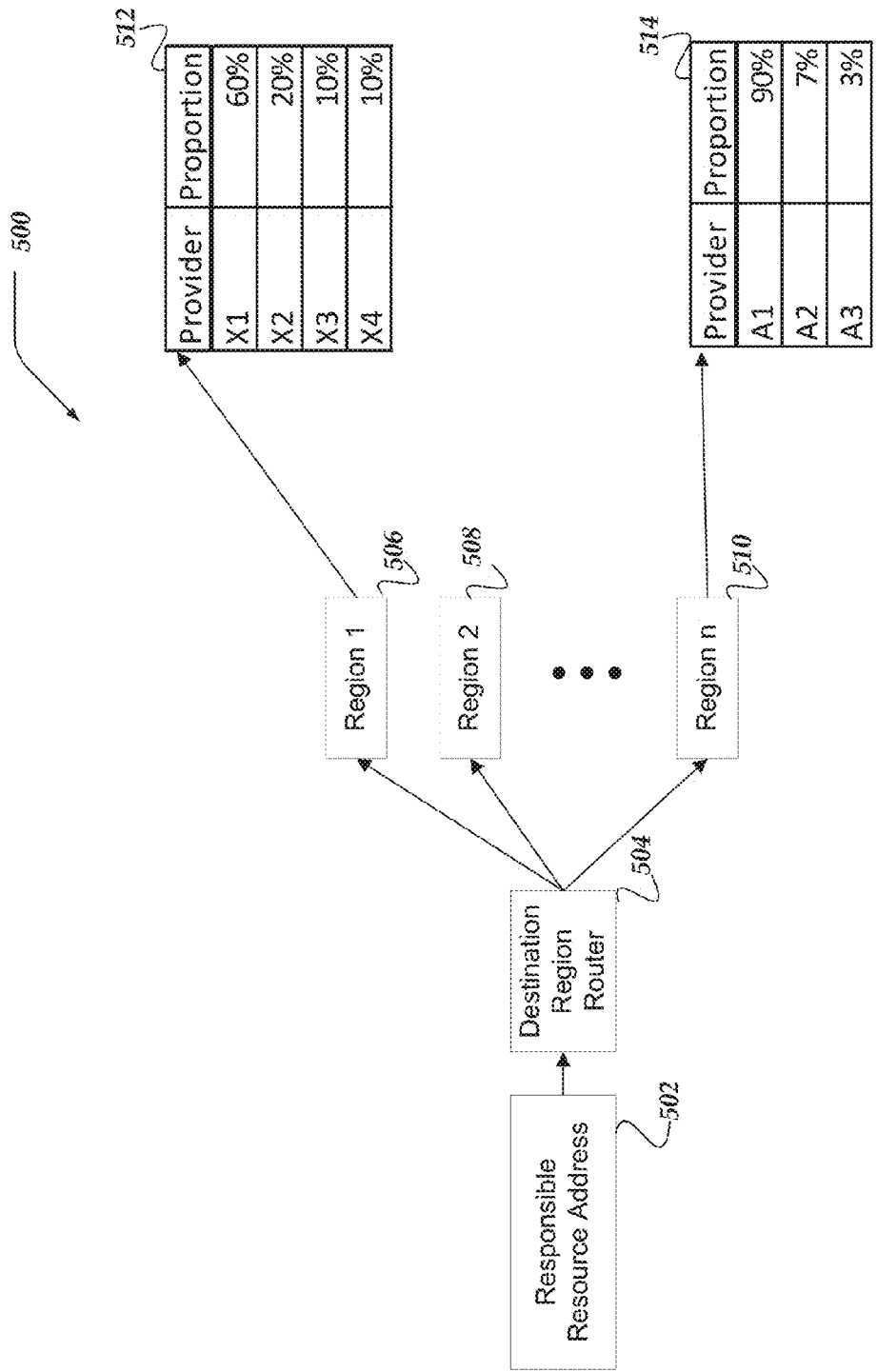
FIG. 5 illustrates a logical schematic of a notification engine in accordance with at least one of the various embodiments.

FIG. 5 illustrates a logical schematic of notification engine 500 in accordance with at least one of the various embodiments. In at least one of the various embodiments, a notification engine may be arranged to route notification messages to target resources using selected message providers. In at least one of the various embodiments, an application or service, such as, scheduler application 322, may be arranged to determine one or more resources (e.g., IT staff members, engineers, administrators, or the like) that are responsible for handling an event message (e.g., a failure in a monitored system). A resource address may be associated with the determined responsible resources. Accordingly, these addresses may be provided to the notification engine to enable it to provider the notification message to the responsible resources.

In at least one of the various embodiments, responsible resource address 502 represents an address associated with a responsible resource that may be used to communicate notification messages. For example, if the responsible resource's preferred notification method is SMS, the responsible resource address may be mobile telephone number. Likewise, resource addresses may be a telephone number, email address, SMS short code, Instant Messaging (IM) address, Uniform Resource Locator (URL), or the like In at least one of the various embodiments, resource addresses may be associated with one or more defined regions. Accordingly, in at least one of the various embodiments, a notification engine may be arranged to include a destination region router, such as, destination region router 504 to determine a region that is associated with a resource address.

In at least one of the various embodiments, regions, such as, region 506, region 508, region 510, or the like, may correspond to geographic boundaries, political boundaries, or the like, such as, confinements, countries, states, provinces, cities, neighborhoods, or the like, or combination thereof. Also, regions may be defined in term of descriptive geography, such as, North America, Northern California, East Chicago, or the like. In at least one of the various embodiments, regions may be defined arbitrarily based on considerations such as population density, customer preferences, or the like.

In at least one of the various embodiments, a notification engine may be arranged to determine the most specific region that corresponds to the resource address. In at least one of the various embodiments, the notification engine may be arranged to employ one or more matching algorithms to determine a best matching region for a resource address. The particular matching algorithms may vary depending on the type of resource address. For example, telephone numbers may be matched to regions differently than email addresses.

In at least one of the various embodiments, telephone numbers may be matched to regions based on their country code, exchange prefixes, and so on. In at least one of the various embodiments, the notification engine may have access to additional information that may be employed to further refine the region determination. For example, in at least one of the various embodiments, the notification engine may be have access to information defining the location of specific telephone number blocks that may be used to determine the appropriate region.

In at least one of the various embodiments, regions may overlap each other. In some cases, a geographically larger region may include one or more smaller included regions. For example, North America may be one region that includes separate regions that correspond to the United States, Mexico, and Canada. Likewise, there may be regions for each US state, postal codes, counties, municipalities, or the like. Since, the notification engine may be arranged to select the most specific region for a given resource address, a broader (bigger) region will not be selected if a more specific region may be determined.

In at least one of the various embodiments, determining a region best associated with a resource address may enable the notification engine to determine a message provider to use to deliver a notification message. In many cases, message providers may have better or worse coverage, reliability, and quality of service, depending on the region. For example, if the phone number (e.g., the resource address) of the responsible resource is associated with a United States wireless carrier, it may be disadvantageous to deliver the notification message using a European message provider. Likewise, for any given region there may be one or more message providers excluded from a region because of their cost, lack of reliability, or the like. Accordingly, one or more message providers may be associated with any particular region.

In at least one of the various embodiments, table 512 and table 514 may represent various message providers that may be associated with regions. In at least one of the various embodiments, each region may have one or more message providers associated with them. Also, in at least one of the various embodiments, a given message provider may be associated with more than one region. In this example, table 512 shows that five hypothetical message providers are associated with region 506. Likewise, table 514 shows that three difference message provider are associated with region 510.

In at least one of the various embodiments, the message providers associated with a region may be distinguishable in terms of reliability, cost, quality-of-service, or the like, or combination thereof. Accordingly, in at least one of the various embodiments, each message provider associated with a region may be associated with a proportional weighting value. The weighting value may be employed to drive notification message to use the most desirable message provider, if there is one. For example, according to table 512, for region 506 message provider "X1" is more desirable than message provider "X3". Also in this example, according to table 514, for region 510 message provider "A1" is preferred over message provider "A3."

In at least one of the various embodiments, multiple message providers may be associated with a region to identify fallback providers that may be used if the preferred message provider is unavailable (e.g., due to a system failure, or the like). Also, rather than exclusively routing notification message using the most preferred provider, message providers may be allocated a notification message based on a proportional distribution corresponding to their weighting values. For example, according to table 512, for region 506 message providers "X3" and "X4" are the least preferred providers. However, in this example, 10% of notifications may be delivered using provider "X3" and 10% may be delivered using provider "X4."

In at least one of the various embodiments, proportional distribution of notifications enables the notification engine to continuously exercise each message provider that may be associated with a region. This enables a notification engine to collect performance metrics from each message provider. Also, if the preferred message provider was used exclusively, if that message provider suffers a system failure, the notification engine would have to switch to a fallback message provider without evidence that it is behaving as expected. In contrast, if proportional routing is employed there will be recent performance metrics for each of the message providers associated with a region.

In at least one of the various embodiments, the notification engine may be arranged to proportionally distribute notification based on resource addresses rather than based on number of messages. Accordingly, in this example, according to table 512, for region 506, 60% percent of targeted resource addresses may be routed to message provider "X1" and 20% of targeted resource addresses may be routed to message provider "X2." Thus, in some case message provider "X2" may be routed more notification messages that message provider "X1" if the resource addresses assigned to message provider "X2" are provided more messages that the resource addresses that are assigned to message provider "X1."

In at least one of the various embodiments, the notification engine may track which message provider is associated with each resource address. Accordingly, the first time a resource address is observed, the notification engine may use the proportional routing value to determine a message provider to use for the resource address. However, the next (and subsequent) time the resource address is observed, the notification engine may use the message provider that was initially determined.

In at least one of the various embodiments, rather than an explicit table data structure a consistent hashing technique may be employed ensure selection of the same provider for a given address. In at least one of the various embodiments, one or more portions of the address may be used to generate a key value for a hash table that may be used to associate addresses to message providers.

In at least one of the various embodiments, this stickiness of a resource address to a message provider enables the responsible resource to receive notification messages from the same message provider. For example, if the resource address is a mobile telephone number and the notification messages are SMS texts, it may be advantageous for the user to receive these texts from the same message provider since the mobile phone will indicate a source (caller-id) of the SMS. If the message providers are changing, in some cases, the SMS text source may also change. Accordingly, to at least reduce confusion of the resources (e.g., users), the notification engine may be arranged to communicate notification messages target to the same responsible resource using the same message provider.

In at least one of the various embodiments, if a message provider goes offline, a fallback message provider may be selected to ensure the notification message may be sent. This may result in a different source address being reported to the targeted responsible resource. If the failed message provider is restored to service, the notification engine may return to routing the notification messages through the previously failed message provider.

In at least one of the various embodiments, the proportional weight values associated with a message provider for a given region may be dynamically adjusted based on various factors, such as, performance metrics, cost, reliability, customer preference, or the like, or combination thereof.

In at least one of the various embodiments, a notification engine may be arranged to reset the association of resource addresses to message providers. In at least one of the various embodiments, if a message provider becomes unavailable (offline), the resource addresses associated with the unavailable message provider may be reset. Accordingly, such resource addresses may be assigned to another message provider.

In at least one of the various embodiments, if the proportional weighting values for a region change significantly, resource addresses for that region may be reset. In at least one of the various embodiments, the resetting process may reset all the resource addresses at once, or there may be a configured bleed-off process that gradually resets the resource addresses based on a time-out value. In at least one of the various embodiments, a notification engine may be configured to define threshold change value that may trigger the one or more reset actions. For example, a notification engine may be arranged to begin resetting resource addresses if the proportional weighting values shift more than 20%.

Further, in at least one of the various embodiments, the number of resource addresses that are reset may be determined based on the updated proportional weighting values. For example, in a system 500, according to table 512, for region 506 message provider "X1" would be assigned 60% of the resource addresses. In this example, if the proportional weighting values were adjusted so message provider "X1" is assigned 30% of resource addresses, a notification engine may be arranged to reset half of the resource addresses assigned to message provider "X1".

In at least one of the various embodiments, if a message provider is determined to be offline or otherwise unavailable, its proportional weighting value may be allocated to the surviving message providers. For example, according to table 512, if message provider "X1" became unavailable, the proportional distribution may be updated by allocating the proportion for X1 to the other providers in table 512 resulting in "X2"=50%; "X3"=25%; and "X4"=25%.

In at least one of the various embodiments, the rules for fallback distribution after a provider becomes unavailable may be independent from the normal distribution. Accordingly, in at least one of the various embodiments, a notification engine may be arranged to use a particular proportional distribution if one or more of the message providers becomes unavailable. For example, if "X1" in table 512 becomes unavailable, the notification engine may be arranged to update the distribution for that particular notification message delivery attempt to "X2"=70%; "X3"=20%; and "X4"=10%, and so on.

Furthermore, in at least one of the various embodiments, client computer 200 or network computer 300 is arranged to include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like.

For example, in at least one embodiment, geolocation information (such as latitude and longitude coordinates, or the like) is collected by a hardware GPS sensor and subsequently employed in the distribution policies for routing messages. Similarly, in at least one embodiment, weather information (such as temperature, atmospheric pressure, wind speed, humidity, or the like) is collected by a hardware weather sensor and subsequently employed in the distribution policies for routing messages. Additionally, in at least one embodiment, electrical power information (such as voltage, current, frequency, or the like) is collected by a hardware electrical power sensor and subsequently employed in the distribution policies for routing messages.

Generalized Operations

FIGS. 6-11 represent the generalized operation of robust routing and delivery of notifications in accordance with at least one of the various embodiments. In at least one of the various embodiments, processes 600, 700, 800, 900, 1000, and 1100 described in conjunction with FIGS. 6-11 may be implemented by and/or executed on a management platform computer, an industrial security computer, a network computer, or the like, such as, network computer 300 of FIG. 3. In other embodiments, these processes, or portions thereof, may be implemented by and/or executed on a plurality of network computers, such as network computer 300 of FIG. 3. In yet other embodiments, these processes, or portions thereof, may be implemented by and/or executed on one or more virtualized computers, such as, those in a cloud-based environment. However, embodiments are not so limited and various combinations of network computers, client computers, or the like may be utilized. Further, in at least one of the various embodiments, the processes described in conjunction with FIGS. 6-11 may be used for communication in a mesh network with overlay networks in accordance with at least one of the various embodiments and/or architectures such as those described in conjunction with FIGS. 4-5. Further, in at least one of the various embodiments, some or all of the action performed by processes 600, 700, 800, 900, 1000, and 1100 may be executed in part by scheduling application 322, notification engine 324, ingestion engine 326, or watchdog application 327, or the like, or combination thereof.

Figure 6:
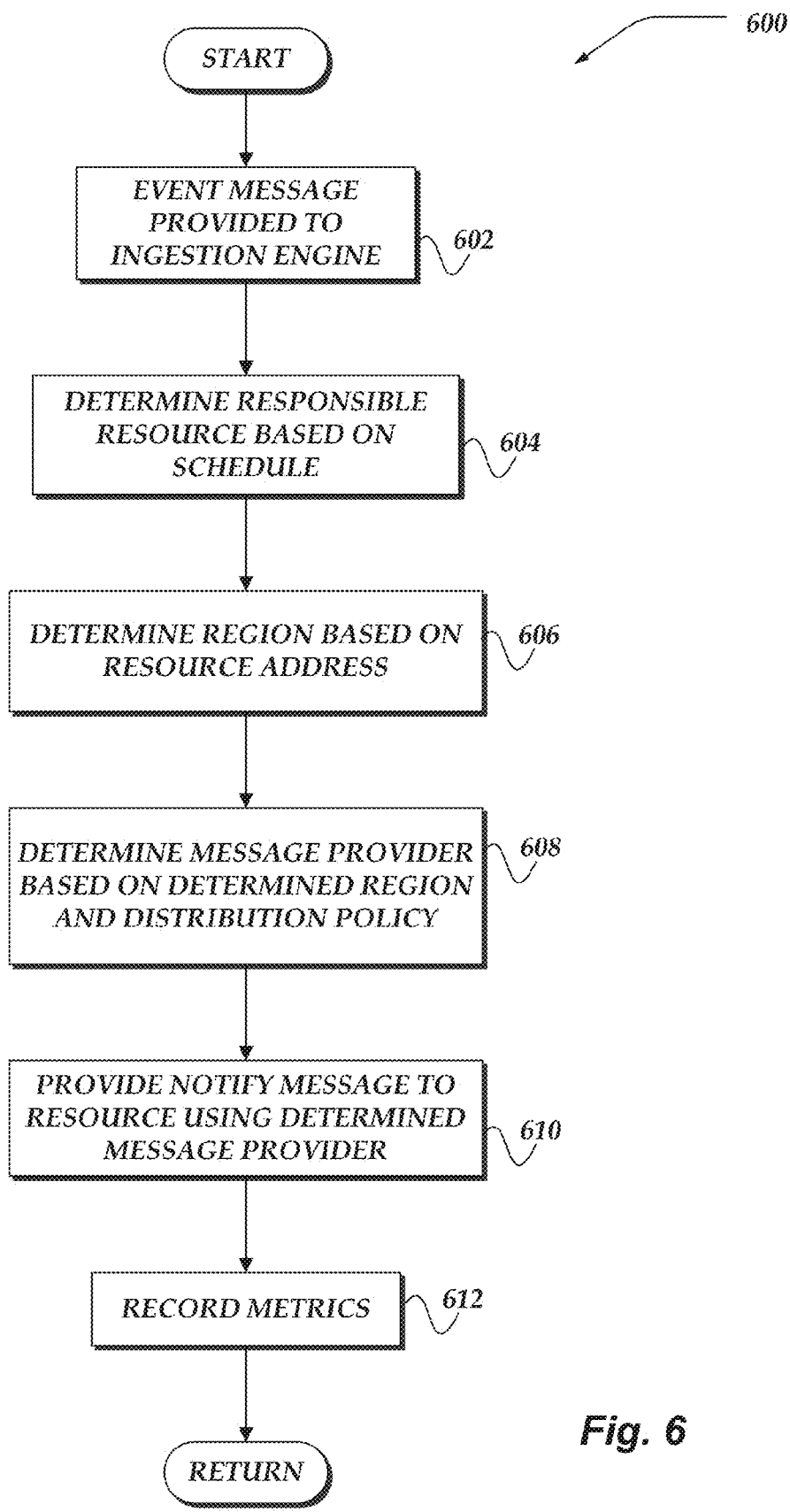
FIG. 6 illustrates an overview flowchart for a process for robust message routing in accordance with at least one the various embodiments.

FIG. 6 illustrates an overview flowchart for process 600 for robust routing and delivery of notifications in accordance with at least one the various embodiments. After a start block, at block 602, in at least one of the various embodiments, one or more event messages may be provided to an ingestion engine. In at least one of the various embodiments, an ingestion engine, such as, ingestion engine 326 may be part of a larger system for communication notification message to the responsible resources.

In at least one of the various embodiments, event messages may be provided through a variety of interfaces and/or APIs, including, RESTful HTTP interfaces, TCP/IP interfaces, various push and/or pull interfaces, or the like, or combination thereof. As described above, event sources may be third-party monitors, custom programs, one or more hardware sensors, or the like, or combination thereof.

At block 604, in at least one of the various embodiments, one or more responsible resources associated with the event messages may be determined. In at least one of the various embodiments, the responsible resources may be one or more team members assigned to an on-call schedule. Accordingly, in some embodiments, a scheduling application, such as, scheduling application 322 may be arranged to determine the one or more resources that are responsible for handling the received event messages at a specific time and/or place.

At block 606, in at least one of the various embodiments, a region associated with the responsible resources' address may be determined. In at least one of the various embodiments, a notification engine may be arranged to employ one or more pattern matching algorithms and/or heuristics to determine a region that best matches the address that is associated with the responsible resource. In at least one of the various embodiments, one or more regions include one or more other regions, in such cases, the notification engine may determine the most specific region based on the targeted resource's address information. For example, a larger region such as a country, may include one or more smaller regions such as states or provinces.

At block 608, in at least one of the various embodiments, a message provider may be determined based on at least the region and a distribution policy. In at least one of the various embodiments, as described above, given message providers may be associated with one or more regions. Accordingly, in at least one of the various embodiments, only message providers that are associated with the determined region may be available for routing. Determining that particular message provider of the associated message providers may be based on one or more distribution policies.

Further, in at least one of the various embodiments, message providers that may applicable and/or associated with the region may be ranked relative to each other along various quantitative dimension, such as, cost, reliability, average delivery latency, or the like. Accordingly, the message providers may be ranked in order of one or more of the dimensions based on configuration information (e.g., the user may determine which dimensions to use for ranking). Thus, in some embodiments, if a message provider is being selected based on the distribution policy, the top ranked message provider for selected dimensions may be selected first, and if that message provider fails, the next messages provider in rank order may be selected. This may continue until a message provider is selected that may be able to deliver the notification message, or all the messages providers associated with a region are unable to deliver the notification message.

At block 610, in at least one of the various embodiments, a notification message may be provided to the determined responsible resource using the determined message provider. The notification engine may send one or more notification message to alert the responsible resources of the event message so they can take appropriate actions.

In at least one of the various embodiments, notification messages may take a variety of forms/formats depending on the preferences of the responsible resources and the capabilities of the message providers. For example, in at least one of the various embodiments, notification messages may be provided using SMS texts, email, mobile device push notifications, HTTP requests, voice calls, library function calls, audio alerts, haptic alert, or the like, or combination thereof.

At block 612, in at least one of the various embodiments, one or more performance metrics may be recorded. One or more performance metrics may be collected during live operations and a deliberate testing operations. In at least one of the various embodiments, performance metrics may be aggregated results generated from raw performance metrics for some or all of the users of the system.

In at least one of the various embodiments, performance metrics may include at least metrics for determining (a) if a notification message is delivered to the intended user and (b) how long it took to deliver the notification message. Some or all of the performance metrics information may be associated to a given region/message provider pairing. Accordingly, the associated information may be employed to predict how long a given message provider may take to deliver other notification messages (and whether it will be successful in doing so at all) in the future.

In at least one of the various embodiments, information used for generating performance metrics may be gathered on "real notification messages" or on "synthetic notification messages". Also, in some embodiments, such information may be gathered by purpose built client devices configured to receive only synthetic notifications messages, or by the actual client devices used by users.

In at least one of the various embodiments, the information for generating performance metrics may also be gathered by message providers. As discussed above, performance metrics may be included in performance profiles of the message providers.

In at least one of the various embodiments, a message provider's relative rankings with regard to certain performance metrics change overtime the time. For example, just because Provider A delivered more reliably and quickly to Region R than Provider B did yesterday does not necessarily mean that will be the case today.

In some embodiments, changes in performance metrics may be unpredictable. Accordingly, message providers may be regularly exercised to detect changes in performance metrics using either real or synthetic notification messages. Information gathered from the regular delivery attempts may be used for maintaining their performance profiles.

Accordingly, in at least one of the various embodiments, the "optimal" message provider selection process may be departed from with some frequency. In at least one of the various embodiments, departure from the optimal message provider selection process may be random or may be deterministic. Departure from the normal selection process may be configured such that it generates enough the data to maintain the performance profiles for some or all of the message providers.

In at least one of the various embodiments, the collected data and/or metrics may be employed in various ways to refine the selection process. For example, in some embodiments, the data may be used to periodically re-rank the providers for a given region. In some embodiments, the system may be arranged such that some or all notification message traffic goes through a random process, where weightings built-in to the random process favor the optimal selection path but leave enough latitude to enable the performance profiles to be kept updated with current performance data.

Accordingly, in at least one of the various embodiments, information may be recorded from each delivery attempt. This information may be used to construct and/or modify performance profiles that may be associated with each provider to enable continuous performance comparisons between the providers associated with a given geographic region.

In at least one of the various embodiments, the collected information may be employed to dynamically optimize the delivery of notification messages. Also, in at least one of the various embodiments, delivery/performance optimization may be mitigated such that each provider associated with a region may be selected often enough to generate performance metrics that may be used to keep their performance profiles relevant and/or up-to-date.

Alternatively, in at least one of the various embodiments, the system may be arranged to generate sufficient performance information using synthetic events and/or synthetic notification messages to keep the provider performance profiles up-to-date. Accordingly, in some embodiments, the system may be arranged to route traffic using the most optimal provider(s) that may be available.

In at least one of the various embodiments, one or more tests may be arranged to validate the performance of different parts of the systems as well as how the providers may be performing. In at least one of the various embodiments, such tests may be arranged to monitor various metrics such as, latency, CPU utilization, memory utilization, failures, dropped messages, or the like, combination thereof. In at least one of the various embodiments, metrics may include tracking failure information, including, the type of failure, time of failure, duration of failure conditions, failure severity, or the like, or combination thereof.

Also, in at least one of the various embodiments, monitoring and testing may include one or more physical sensors that may monitor characteristics such as signal strength, line voltages, power fluctuations, circuit continuity testing, or the like, or combination thereof.

In at least one of the various embodiments, the system may be arranged to include one or more test harnesses that may run one or more tests or sets of tests that exercise different parts of the system. One or more of these test may be similar to unit tests in that they may test the functionality of a small portion of the overall process. In at least one of the various embodiments, one or more event messages may be generated and provided to resources (team members) that may be responsible for operating and maintaining the notification system. In at least one of the various embodiments, one or more tests may be executing during production runtime, whereas other tests may arranged to execute during explicit testing/maintenance periods.

In at least one of the various embodiments, tests performed by block 614 may be arranged to test and validate the one or more ingestion mechanisms. As described above, one or more monitoring services may employ one or more integration interfaces to provide event messages to the notification system. Accordingly, one or more tests may be arranged to validate that information received through an interface is in the correct format. Likewise, tests may be arranged to validate and/or confirm that information rejected by an interface is actually in an invalid format.

Figure 7:
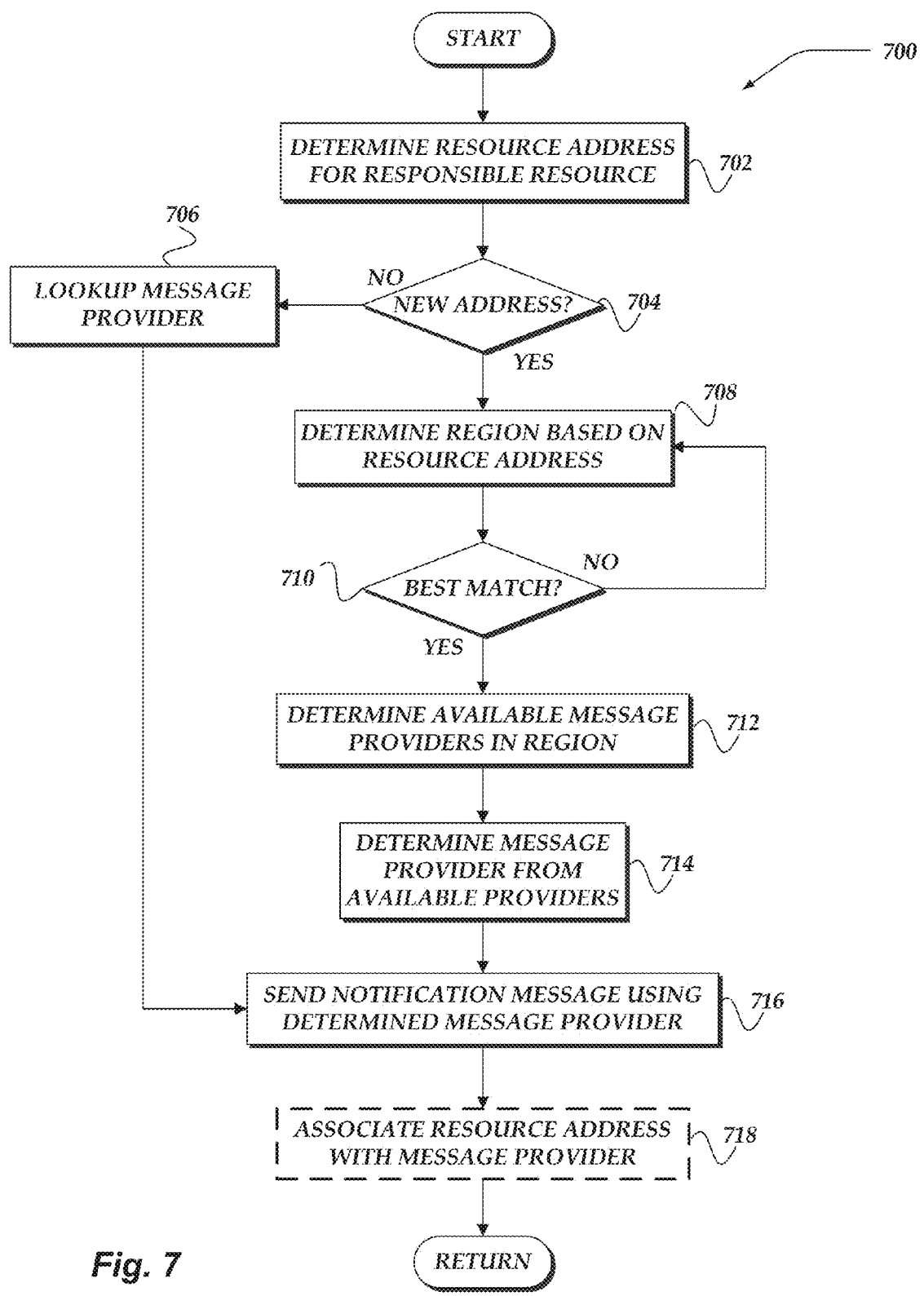
FIG. 7 illustrates a flowchart of a process for address based distribution of notification messages in accordance with at least one of the various embodiments.

FIG. 7 illustrates a flowchart of process 700 for address based distribution of notification messages in accordance with at least one of the various embodiments. After a start block, at block 702, in at least one of the various embodiments, a resource address may be determined for a responsible resource. In at least one of the various embodiments, a scheduler application may be arranged to determine a particular resource that may be responsible for a given received event message at a given time. Further, the scheduler application may maintain a database of information that includes the resource's preferred methods of being notified. For example, the resource address may be a telephone number for receiving SMS texts, a pager number, an email address, or the like. In at least one of the various embodiments, the scheduling application may be arranged to provider the resource address information to the notification engine. Alternatively, in at least one of the various embodiments, the notification engine may retrieve the resource address information from a data store based on the resource information provided by the scheduling application.

At decision block 704, in at least one of the various embodiments, if the resource address is currently assigned a message provider, control may flow to block 706; otherwise control may flow to block 708. In at least one of the various embodiments, as described above, resource address may be associated (e.g., pinned to one message provider as long as possible.

In at least one of the various embodiments, since each message provider may be seen as a unique message source it may be preferred to reduce the message provider variability for a given resource address. Thus, in at least one of the various embodiments, resource addresses may be associated with a message provider for as long as possible.

In at least one of the various embodiments, the association of a resource address to a message provider may be reset in response to various conditions being met, such as, if the message provider is disabled, or otherwise performing poorly for a given region, significant configuration changes (e.g., rebalancing or message providers) may also trigger a reset action that disassociates a resource address from a message provider.

At block 706, in at least one of the various embodiments, the message provider that is associated with the resource address may be determined or otherwise retrieved from a data store. In at least one of the various embodiments, the notification engine may confirm that the message provider is available for sending notification messages. If the message provider is unavailable, control may flow to block 708 (flow line not shown in FIG. 7); otherwise, control may flow block 716.

At block 708, in at least one of the various embodiments, the notification engine may be arranged to determine a region based on the value of the resource address. In at least one of the various embodiments, the notification engine may be arranged to execute one or more pattern matching algorithms to determine the best match for given resource address. In at least one of the various embodiments, a best match may be configured to be the most specific region that may be associated with the resource address.

In at least one of the various embodiments, if a resource address is a telephone number, the notification engine may examine different parts of the telephone number, such as, the country code, exchange value, or the like, or combination thereof. For example, the combination of a country code and a telephone exchange value may be employed to determine geographic source of the telephone number. In some cases, one or more resource addresses, or blocks of resource addresses may be assigned a region based on configuration information.

At decision block 710, in at least one of the various embodiments, if the best match for the resource address is found, control may flow to block 712; otherwise, control may loop back to block 708. In at least one of the various embodiments, the notification engine may be arranged to find the most specific region that may be associated with the resource address.

In at least one of the various embodiments, the matching process may be arranged to cascade from more general to specific based on the composition of the resource address. Accordingly, the country code of a telephone number may indicate a country region, which may be refined to a more specific region based on the telephone exchange portion of the telephone number. For example, if the resource address is a City of Chicago, Ill., USA telephone number, such as, 1-312-555-1212, one or more regions such as, "North America," "United States," "State of Illinois," "Cook County," and "City of Chicago" may be determined to be associated with the resource address. However, the region "City of Chicago" may be determined to be the best match since it is the most specific region.

In at least one of the various embodiments, the particular methods for determining a region match may vary depending on the type of resource address. For example, if the resource address is an email address, information associated with the domain name of the email address may be employed to determine the region.

At block 712, in at least one of the various embodiments, the available message providers associated with the determined region may be determined. In at least one of the various embodiments, the notification engine may retrieve a list/collection of message providers that are associated with a particular region from a database or other data store. In some cases, there may be message providers that may be associated with a region but for some reason are determined to be unavailable. As discussed in more detail below, in at least one of the various embodiments, a message provider may be determined to be unavailable for a variety of reasons, including, being offline, too costly, too unreliable, or the like, or combination thereof.

At block 714, in at least one of the various embodiments, the notification engine may employ various methods to determine and/or select a message provider from the list of available providers. As discussed above, the notification engine may employ proportional distribution, or the like. In at least one of the various embodiments, each message provider may be associated with additional information that may be employed for determining if it may be selected for routing a message. This information may include weighting and/or preference information as well as raw and/or aggregated performance metrics that may have been collected.

At block 716, in at least one of the various embodiments, the notification engine may generate one or more notification messages corresponding to the event messages and provide them to the determined message provider. Accordingly, the message provider may provide the notification messages to the one or more responsible resources using the determined resource address.

At block 718, in at least one of the various embodiments, optionally, if a resource address is not associated with a message provider, the notification engine may associate the resource address with the determined message provider. Accordingly, in at least one of the various embodiments, the next time a notification message is targeted at this resource address it may be sent using the determined message provider. As discussed above, in at least one of the various embodiments, a hash table using a hash key generated by applying a hash function to the resource address may be employed to associate a given resource/resource address with the determined message provider. Accordingly, in at least one of the various embodiments, the next time the same resource address is encountered, the same hash function may be used to generate a hash key that references the previously used message provider. In some embodiments, the hash table may be emptied and/or reset if conditions change, such as, changes to set of the available message providers. Next, control may returned to a calling process.

Figure 8:
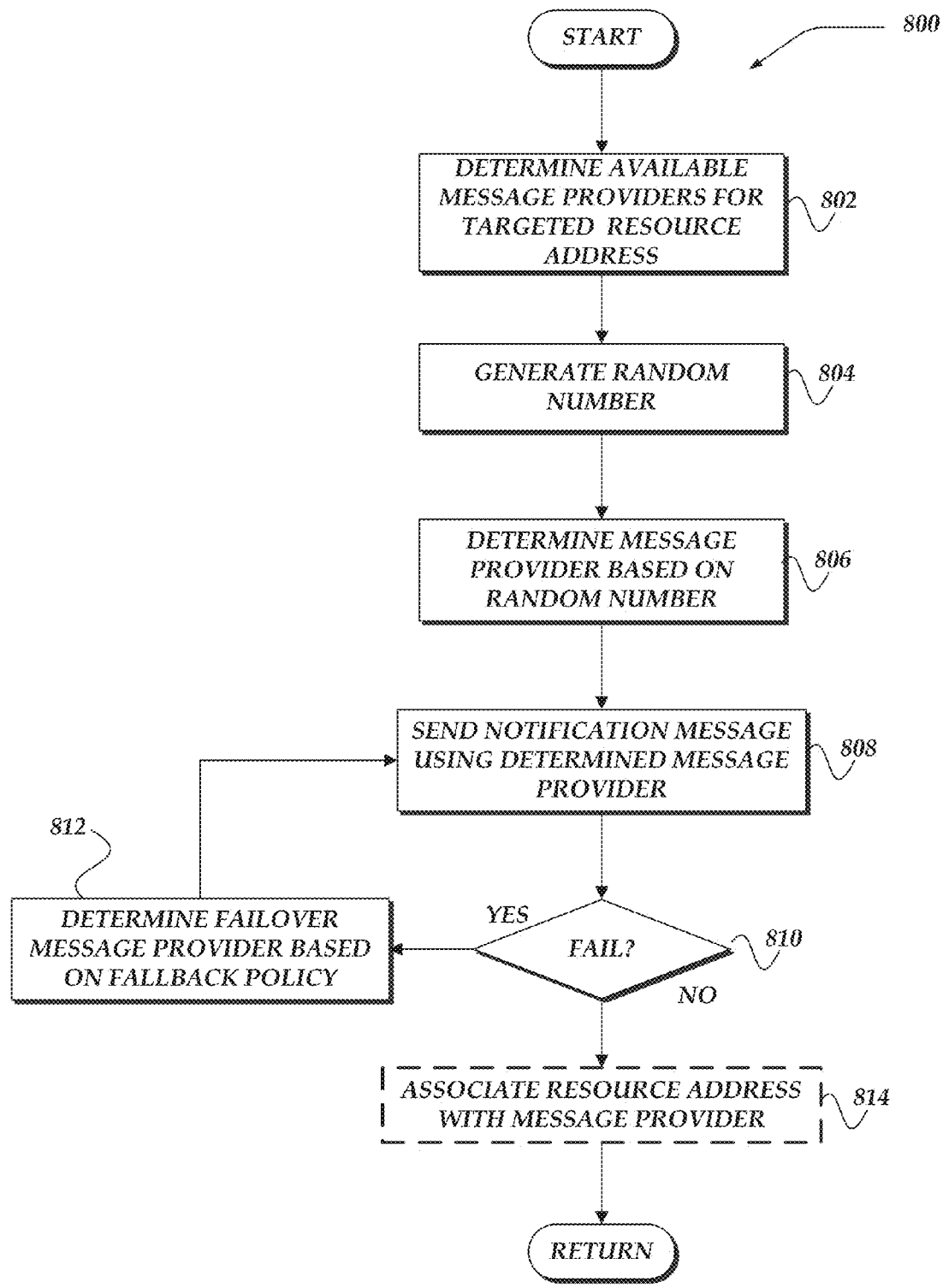
FIG. 8 illustrates a flowchart for a process for proportional message routing in accordance with at least one of the various embodiments.

FIG. 8 illustrates a flowchart for process 800 for proportional message routing in accordance with at least one of the various embodiments. After a start block, at block 802, in at least one of the various embodiments, the available message providers for a targeted resource address may be determined. In at least one of the various embodiments, as discussed above a set of available message providers may be determined based on a region that may be associated with the resource address that messages are being routed to.

At block 804, in at least one of the various embodiments, the notification engine may generate a random number. In at least one of the various embodiments, the random number may be generated using pseudo-random number generator configured to generate a value such as, 0-99 or 0.0-0.99 used for making a probabilistic selection.

In at least one of the various embodiments, the "random" number generator may be arranged to be generated by hashing the resource address to generate an integer hash code. Accordingly, in at least one of the various embodiments, each time the same resource address is encountered, the hashing function may generate the same hash code result. One of ordinary skill in the will appreciate that there are one or more well-known methods for generating a hash code from another value. For example, see the Java library method hashCode( ) which produces a 32-bit hash code from a string.

At block 806, in at least one of the various embodiments, a message provider may be determined based on the generated random number. In at least one of the various embodiments, each of the available message providers may be associated with a proportional weighting value. (See, FIG. 5). Accordingly, the random number may be used to select one of the message providers according the proportional weighting values. For example, if message provider "X1" has a 60% proportional weighting value, if the random number is between 0 and 59 (or 0.00 and 0.59) the message provider "X1" may be selected. Likewise, if table 512 is used as an example, message provider "X2" may be selected if the random value is 0.60 to 0.79; message provider "X3" may be selected if the random value is 0.80 to 0.89; and message provider "X4" may be selected if the random value is 0.90 to 0.99.

In at least one of the various embodiments, if the random number is a hash code generated by hashing the resource address, the message provider may be selected using the hash code value and a modulus operation. In at least one of the various embodiments, an integer hash code, C, may be generated from the value of resource address; a modulus value M may be generated by summing proportional weight values (e.g., 100 corresponding 100%); then a probability value P may be generated from P=C mod M. Then the message provider may be selected based on its proportional weight value and value P.

For example, if a hash code for resource address "1-312-555-1222" is 339149493, each time this resource address is encountered the hash code will be the same (assuming the hash code algorithm is unchanged). Continuing with this example, referring to table 512 in FIG. 5, the sum of the proportional values is M=X1 proportion+X2 proportion+X3 proportion+X4 proportion, which in this example is 100=60+20+10+10. Then since 339149493 mod 100=93, the provider may be determined to be X4 since 93 exceeds the sum of proportions of X1, X2, and X3 (e.g., 93>60+20+10). For comparison, if the resource address is "1-312-555-2222" its decimal hash code is 339411638 which leads to 339411638 mod 100=38; resulting the selected of message provider X1, since 38<60. Likewise, a modulus result of 70 would select provider X2, a modulus result of 83 would select message provider X3, and a modulus result greater than 90 would select message provider X4, as shown above.

In at least one of the various embodiments, the hash code selection method may inherently associate (pin) a resource address to the same message provider since the hash code does not change unless either the hash code algorithm or the probabilities assigned to the message providers changes. Also, in some embodiments, as discussed above, consistent hashing algorithms may be employed to that generate hash keys from the resource address. Accordingly, these hash keys may be used to determine the message provider.

In at least one of the various embodiments, consistent hashing algorithms may be used to minimize the number of resource addresses that may be re-mapped to different providers if the the weights are changed or providers are added or removed.

At block 808, in at least one of the various embodiments, a notification message may be generated and sent the resource address using the determined message provider. In at least one of the various embodiments, the notification engine may be arranged to construct a message using a format that is compatible with the resource address. For example, if the resource address is a telephone number and the resource is configured to receive SMS text messages, the notification engine will generate a SMS text message and provide it the message provide for delivery to the resource.

In at least one of the various embodiments, the event message provided by the event source may include a name field, description field, or the like, that may be included in the notification message. Also, in at least one of the various embodiments, the notification engine may be configured to include additional meta-data in the notification message, such as, timestamp, originator, priority, category, or the like, or combination thereof.

At decision block 810, in at least one of the various embodiments, if the message fails to be successfully delivered, control may flow to block 812; otherwise, control may flow to block 814.

In at least one of the various embodiments, the notification engine may arranged to look for one or more acknowledgments from the resource that he or she received the notification message. For example, depending on the message provider, if SMS messaging was used to send a notification message, a message delivery report may be automatically provided if the notification message is successfully delivered. In other embodiments, the responsible resource may manually respond to message using the client computer to confirm the delivery of the message.

In at least one of the various embodiments, the message provider may provide a "delivery failed" report for various reasons, such as, unknown/bad address, network issues, timeout or undue delay is sending message, or the like, or combination thereof. In any event, in at least one of the various embodiments, if a timely message fail notification is received, or message send failure is otherwise indicated, the notification engine may be arranged to perform one or more fallback actions.

At block 812, in at least one of the various embodiments, a failover message provider may be determined using a configured fallback policy; control may then flow back to block 808.

In at least one of the various embodiments, the notification engine may include configuration information that defines one or more failover/fallback strategies that may be executed if a notification message delivery attempt fails. In at least one of the various embodiments, the notification engine may attempt to resend the same message using the same message provider a defined number of time (e.g., five retries).

In at least one of the various embodiments, the notification engine may select another message provider from the remaining untried message providers that are associated with the region associated with the resource address. In at least one of the various embodiments, the proportional weight of the failed message provider may be evenly distributed to the remaining message providers and applied to select the next message provider. Alternatively, in at least one of the various embodiments, an ordered list of message providers may be configured defining the order the remaining message providers should be used after a message send failure. For example, upon a message failure, the notification engine may be arranged to employ the highest quality message provider to help ensure that the failed message may be delivered without further delay. In at least one of the various embodiments, the ordered list may be rank ordered based on the proportional weights with the failed message provider (the provider selected in block 806) omitted. This way the system does not attempt to resend the notification message using the failed message provider.

At block 814, in at least one of the various embodiments, optionally, the message provider may be associated with the resource address. Accordingly, subsequent notification messages may be sent using the determined message provider rather than going through the process to determine a message provider. This block is optional because if a hash code is used to determine the message provider, the explicit association to a message provider may be unnecessary since it may be determined from the hash code of the resource address. Next, control may be returned to a calling process.

Figure 9:
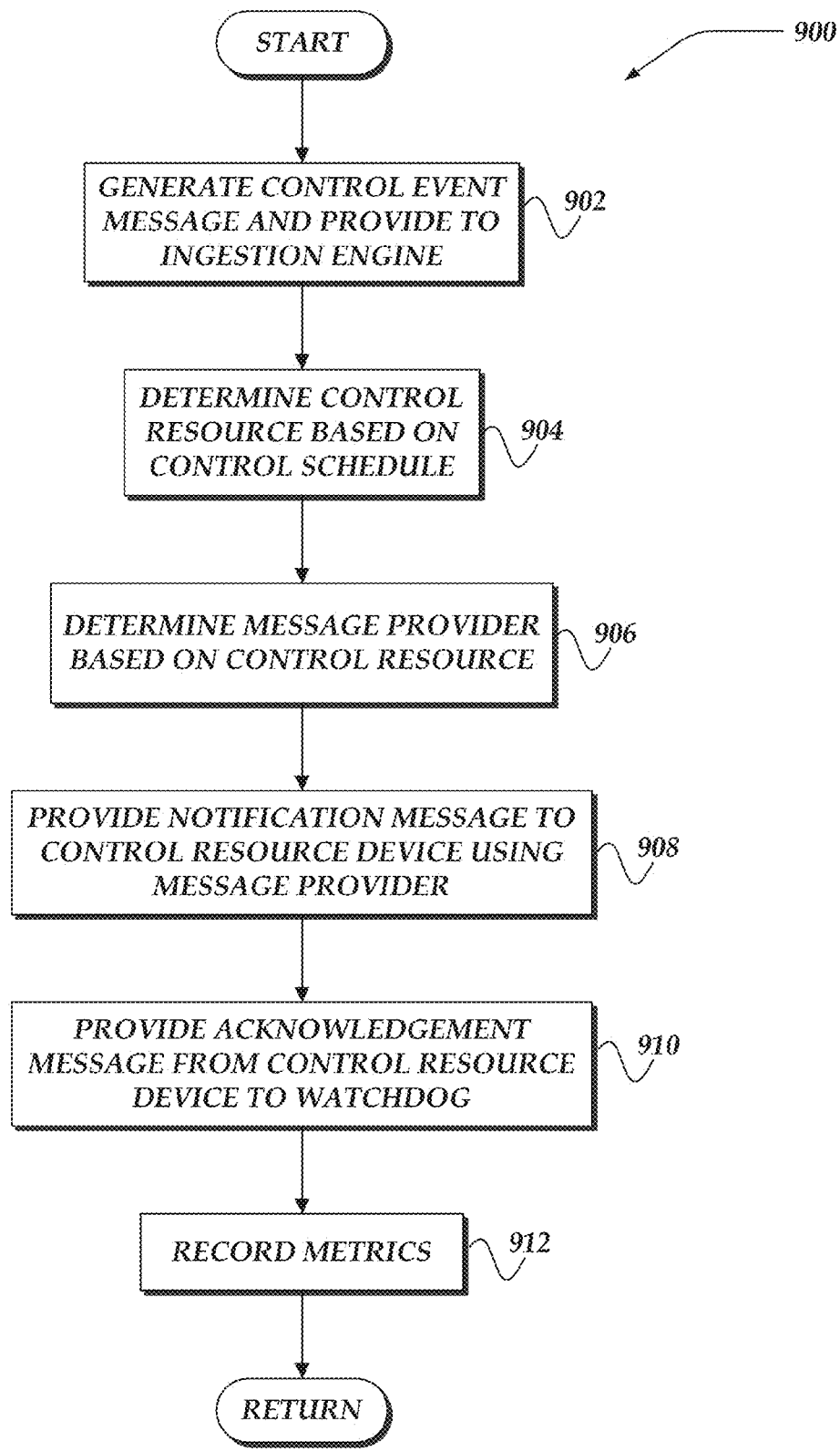
FIG. 9 illustrates a flowchart for a process for end-to-end message provider testing in accordance with at least one of the various embodiments.

FIG. 9 illustrates a flowchart for process 900 for end-to-end message provider testing in accordance with at least one of the various embodiments. After a start block, at block 902, in at least one of the various embodiments, one or more control event messages may be generated and provided to the ingestion engine. The event messages may be referred to a control event messages because they are generated on purpose for testing the performance and reliability of the notification system. In at least one of the various embodiments, the event messages may be provided using the same API's and/or interfaces that are used by production customers. In at least one of the various embodiments, the event source may be a watchdog service, such as, watchdog application 327, or the like.

In at least one of the various embodiments, the watchdog application may be arranged to generate control event messages based on one or more configured policies. In some embodiments, control event messages may be generated at regular time intervals, in other cases, control event messages may be generated more randomly at varying time intervals and/or message rates. In at least one of the various embodiments, control event messages such as heartbeat event messages may be triggered periodically to continually confirm that the notification system is processing event messages.

In at least one of the various embodiments, a watchdog service may be arranged to generate a historical log to record the time and frequency the control event messages. Accordingly, a historical log of control event messages may be employed to enable deterministic replays of the control event messages.

At block 904, in at least one of the various embodiments, a control resource associated with the control event message may be determined by a scheduler application. In some embodiments, a control resource is a resource configured to handle control event messages for testing purposes.

In at least one of the various embodiments, to facilitate testing, control resources may be defined and assigned to a control schedule that may be associated with the control event messages. The term control resources is used here to differentiate between actual responsible resources and those defined for testing the system.

In at least one of the various embodiments, control event messages may be arranged such that one or more message providers are continually tested to confirm their availability. Control event messages may be constructed such that they are associated with specific control resources that may have resource addresses associated with specific message providers. For example, control resources may be configured such that there is at least one for each message provider. Accordingly, the performance of various message providers may be confirmed.

In at least one of the various embodiments, a control client computer, such as a mobile telephone may be expressly associated with one or more control resources to ensure that there is end to end testing of the messaging provider infrastructure. In at least one of the various embodiments, this enables the watchdog service to confirm the condition of the message provider's network independently from diagnostic reporting that may be offered by the message provider. For example, a message provider's publically available diagnostics may report that its network if fully operational, however there may be failures or performance issues that may be unnoticed and/or unreported by the message provider. Accordingly, the end to end provider testing may ensure that the notification engine is aware of unreported issues.

Further, for a given message provider there may be multiple service carriers that it may support for delivery the notification messages to the client computer/telephone of the targeted responsible resources. Accordingly, in at least one of the various embodiments, control resources may be selected such that one or more service carriers (e.g., wireless telephone carriers) employed by a message provider may be exercised. For example, if a message provider utilizes four service carriers to deliver SMS text messages, the watchdog service may be configured to include at least four control resources where each control resource has a resource addresses that is served by one of the four service carriers. Note, in at least one of the various embodiments, different message providers may rely the same service carriers depending on the region they serve. However, the performance of the different message providers may vary depending on the service carrier. Accordingly, the watchdog services may be arranged to test and measure the performance of message providers based on the service carriers that are used. For example, in a country with four major wireless telephony carriers, each message provider is likely to delivery messages to resources address on all four carriers. In some embodiments, the watchdog server will include client computers/mobile telephones that are provisioned and serviced by each service carrier used by one or more message providers.

At block 906, in at least one of the various embodiments, as discussed above, a message provider may be determined based on the resource address of the control resource. In at least one of the various embodiments, the message provider here is not referred to as a "control" message provider, because the message provider is an actual live production message provider that may be user to send live notification messages. In at least one of the various embodiments, the control resource address may be assigned to a control region that is associated with one or more message providers. In at least one of the various embodiments, the control region may be expressly mapped to the control resource address using configuration information.

In at least one of the various embodiments, the resource address may also be associated with a particular service carrier. This association of the resource address and the service carrier may be known in advance and stored as configuration information. Accordingly the performance for a given combination of a message provider and a service carrier may be tested.

At block 908, in at least one of the various embodiments, the determined message provider may be employed to send a notification message to the control resource. In at least one of the various embodiments, the notification engine may generate a notification message that is sent to the control resource using a particular service carrier. In at least one of the various embodiments, the notification engine may generate the message format the same way it generates a live/production notification message. Accordingly, the notification message may be provided to a client computer, such as, mobile device, that may be associated with the control resource address.

At block 910, in at least one of the various embodiments, one or more acknowledgment messages may be sent from the control resource's client computer to the watchdog service. The acknowledgement messages may include performance metrics such as a timestamp that indicates when the control notification message was received, and so on.

In at least one of the various embodiments, an application, such as, notification monitoring application 224 may be installed on the control resources client computer. Accordingly, if the control resource client computer is provided a notification message, the notification monitoring application may generate a response and provide it to the watchdog service.

In at least one of the various embodiments, the notification monitoring application may be arranged to collect performance metrics related to receiving the notification message. For example, a notification monitoring application may be arranged to capture a timestamp of when the notification message is received at the client computer. The timestamp may be compared with a time when the message was given to the message provider to determine a latency metric that may be used for evaluating the message provider.

At block 912, in at least one of the various embodiments, the watchdog service may record the metric information in a data store. In at least one of the various embodiments, the watchdog server may record raw data and/or aggregate data representing one or more performance metrics captured by the watchdog service. Next, control may be returned to a calling process.

Figure 10:
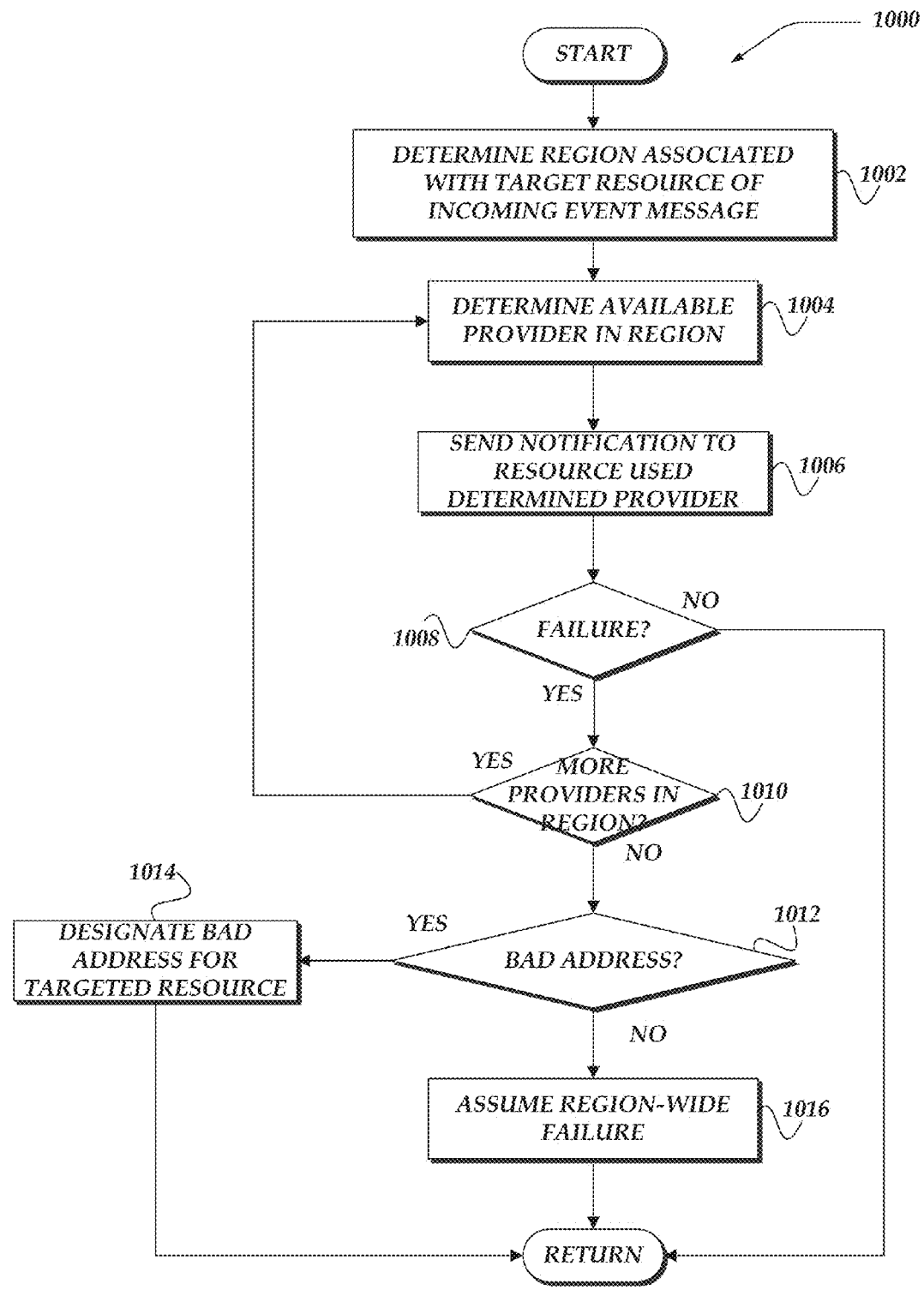
FIG. 10 illustrates a flowchart for a process for distinguishing between multi-provider failures and invalid resource addresses in accordance with at least one of the various embodiments.

FIG. 10 illustrates a flowchart for process 1000 for distinguishing between multi-provider failures and invalid resource addresses in accordance with at least one of the various embodiments. After a start block, at block 1002, in at least one of the various embodiments, the region associated with the target resource address of one or more incoming event messages may be determined.

At block 1004, in at least one of the various embodiments, an available message provider in the determined region may be determined. In some cases, the resource address for the target resource may already be associated with a message provider, if so that message provider may be selected. At block 1006, in at least one of the various embodiments, a notification message may be generated and provided to the determined message provider for delivery to the client computer of the targeted resource.

At decision block 1008, in at least one of the various embodiments, if the notification message failed to be delivered to the target resource (or its client computer), control may flow decision block 1010; otherwise, control may be returned to a calling process.

At decision block 1010, in at least one of the various embodiments, if there are more message providers associated with the determined region, control may loop back to block 1004; otherwise, control may flow to decision block 1012.

In at least one of the various embodiments, as described above one or more fallback policies may be executed to determine a fallback message provider that may be associated with the region that is associated with the target resource address.

At decision block 1012, in at least one of the various embodiments, if the resource address of the targeted resource is determined to be a bad address, control may flow to block 1016; otherwise control may flow to block 1014.

In at least one of the various embodiments, as described above the notification engine may be arranged to track performance metrics for message providers and/or for message providers by regions. Accordingly, the notification engine may be arranged to monitor the number of failures that occur for message providers associated with a region over a configured time window. For example, a time window may be configured to have a duration of ten minutes, accordingly failures that have occurred within the last ten minutes may be considered to fall within this same time window.

Accordingly, in at least one of the various embodiments, a failure count threshold value may be defined based on a time windows. If the number of failures for all message providers in the same region exceed a defined threshold value in a time window, the notification engine may be configured assume that the region is experiencing a region-wide performance problem.

In at least one of the various embodiments, if using real (rather than synthetic) traffic to develop provider profiles, a message provider's failure to deliver to a resource address may be an issue specific to the supplied resource address rather than the message provider. In some embodiments, this may happens if a user accidentally supplies an invalid resource address, such as, a phone number, an email address, or the like. In some cases, the message provider may conclusively report that the resource address is bad. However, in other cases, the message provider may report a generic failed-to-deliver message. The client side instrumentation described above may report conclusively that a message is delivered, but it generally is unable to report messages that failed to be delivered.

Various methods, including those described above, may be used to help classifying delivery errors. In at least one of the various embodiments, a failure of a message provider to deliver to a resource address that has worked in the recent past (within a defined time threshold) may be weighted as more severe than a failure to deliver to a resource address that has no prior history or no recent history of successful deliveries.

Also, in at least one of the various embodiments, failures of a message provider to deliver to a resource address that another message provider is able to successfully deliver to (as part of the failback strategy) may be weighted as more severe than one where no other message provider was able to deliver the message.

Further, in at least one of the various embodiments, the message provider's ability to deliver to other resource addresses in the same region just before and after its failure to deliver to a specific resource address may be examined. High ratio of successful deliveries versus failures in a given time window may indicate bad addresses. Lower ratios may indicate a higher chance that there may be a general problem with the message provider's ability to route to a region.

At block 1014, in at least one of the various embodiments, since the failures seem to be limited to the resource address being used, the notification engine may designate the resource address as a bad address. Accordingly, the notification engine will refrain from attempting to send notification messages to the resource address marked as bad. However, the notification engine may raise an alarm to one or more other resources that may be associated with the resource with the bad address so they problem can be resolved. For example, a mobile telephone number may have been entered into the system incorrectly. Or, in other cases, the resource address may be removed or disconnected from service.

At block 1016, in at least one of the various embodiments, since the failure may be a region wide failure rather than the result of a bad resource address or a few failing message providers, one or more alarms may be generated to other resources or operators of the notification engine to indicate that there is a problem. Also, in some embodiments, since the failure is determined to be region-wide, the notification engine may disable the process of marking resources as having bad addresses. Next, control may be returned to a calling process.

Figure 11:
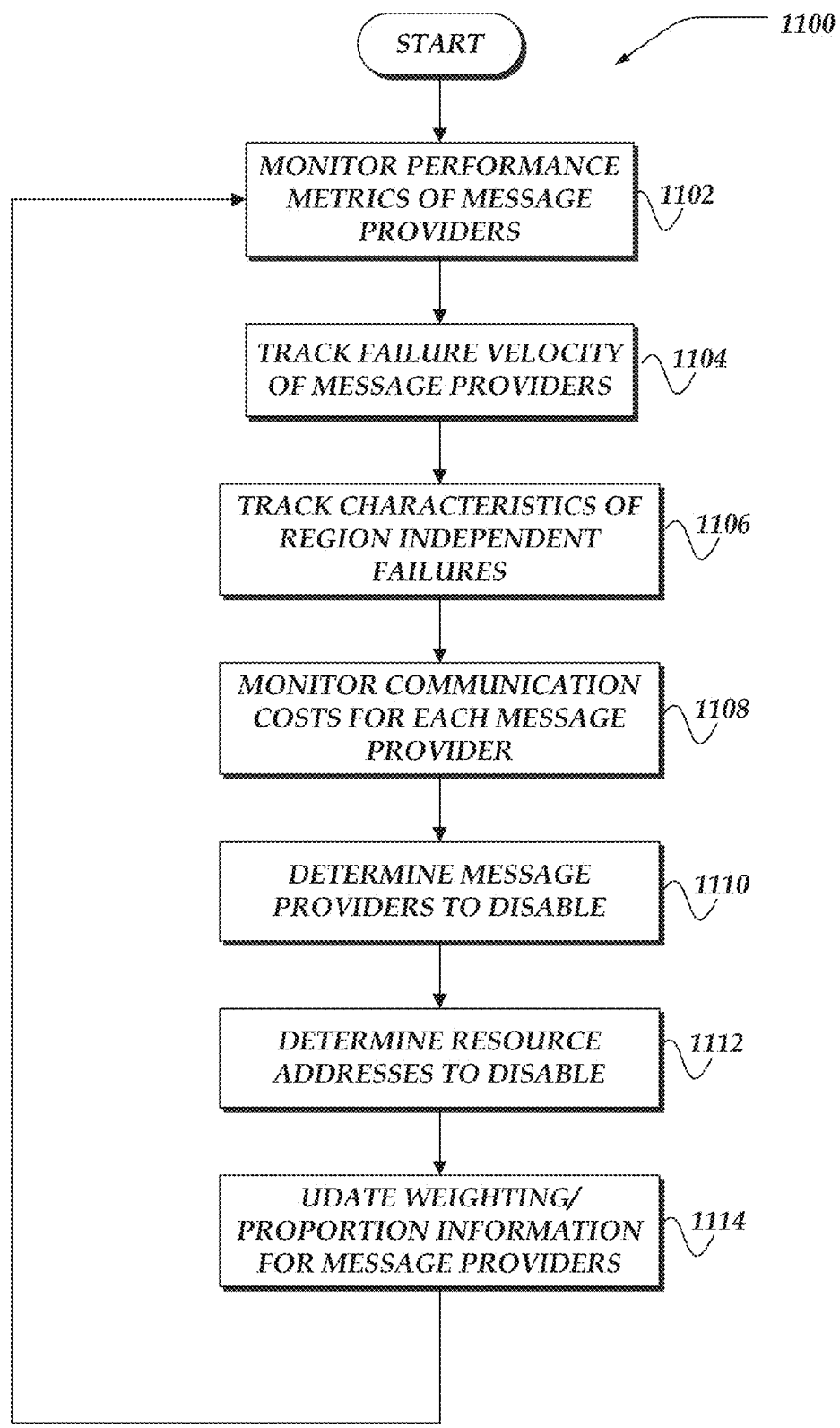
FIG. 11 illustrates a flowchart for a process that monitors one or more performance metrics and updates provider profile information in accordance with at least one of the various embodiments.

FIG. 11 illustrate a flowchart for process 1100 that monitors one or more performance metrics and updates weights and proportional allocation information in accordance with at least one of the various embodiments. After a start block, at block 1102, in at least one of the various embodiments, one or more performance metrics of some or all of the message providers may be monitored and collected. In at least one of the various embodiments, performance metrics may be monitored and/or collected by a watchdog service, such as, watchdog application 327.

In at least one of the various embodiments, metrics may be collected at multiple points within the system. Metrics may include timing the duration and/or latency of information traveling through the system. Also, metrics may include timing the absence of activity as well. Further, in at least one of the various embodiments, metrics may include tracking the amount of computing resources, memory resources, network resources, or the like, consumed by the various parts of the system.

In at least one of the various embodiments, metrics may include tracking failure information, including, the type of failure, time of failure, duration of failure conditions, failure severity, or the like, or combination thereof.

In at least one of the various embodiments, monitoring may include one or more physical sensors that may monitor characteristics such as signal strength, line voltages, power fluctuations, circuit continuity testing, or the like, or combination thereof.

At block 1104, in at least one of the various embodiments, a failure velocity may be determined and tracked for some or all of the message providers. In at least one of the various embodiments, process 1100 may be arranged to compute a rate of failures associated with various portions of the system as well associated with the various message providers used by the system. Accordingly, an increasing velocity of failures may provide early warning that a portion of the system is having problems. Also, in at least one of the various embodiments, an increasing velocity of failures associated with a message provider (e.g., message delivery failures) may provide early indication that the message providers is not working as well expected. For example, an increased velocity of failures may indicate that an error condition has occurred before the actual number of failures has exceeded a defined threshold.

At block 1106, in at least one of the various embodiments, characteristics of region independent failures may be monitored and tracked. In at least one of the various embodiments, message providers may service multiple regions. In such cases, performance characteristics across different regions may be collected.

At block 1108, in at least one of the various embodiments, communication costs associated with some or all of the message providers may be monitored. In at least one of the various embodiments, if the cost of a particular message provider increases, it may become advantageous to reduce the number of notification messages it sends. Accordingly, in at least one of the various embodiments, a notification engine may be arranged to monitor the relative costs of the different message providers. In some embodiments, users/clients of a notification system may provide price/cost preferences indicating that they would prefer lower cost message providers even if it may result in lower performance.

At block 1110, in at least one of the various embodiments, one or more message providers, if any, may be determined for disabling. In at least one of the various embodiments, based on the collected metrics, the notification engine may determine if one or more message providers are disabled from providing messages. This determination may be based on one or more scores determined from the monitored metrics.

Also, in at least one of the various embodiments, whether a particular message provider is disabled may depend on the region. In some embodiments, a message provider may be disabled for one or more regions while it remained enabled for other regions.

In at least one of the various embodiments, a notification engine may be arranged to employ one or more rule based policies for determining if a message provider should be disabled. This may include configuration information or the like. In some cases, policies may be defined using scripts, built-in to the application, or the like, or combination thereof.

Accordingly, in at least one of the various embodiments, policies for used for disabling message provide may include conditions, such as, number of failures, velocity of failures, latency, type of failures (e.g., some types of failures may be more critical than others), number of failures in a given time window, or the like, or combination thereof. In at least one of the various embodiments, failures may include physical failures, such as, voltage fluctuations, power outages, circuit discontinuity, or the like, or combination thereof.

Likewise, in at least one of the various embodiments, policies rules/configuration information may be defined for determining if a previously disabled message provider may be enabled. For example, system testing (e.g., watchdog services) may determine that a message provider is performing well enough to be enabled for one or more regions. Also, if the message provider was disabled because of its price, a user/client may have provided input to indicate that the higher price is acceptable.

At block 1112, in at least one of the various embodiments, one or more resource address, if any, may be determined for disabling. In at least one of the various embodiments, there may be individual resource addresses and/or resource address patterns that may be determined to be malicious. For example, some resource addresses may be arranged to deliberately cause an exorbitant charge to be charged back to the notification system each time they are sent a notification message. Accordingly, performance monitoring may be arranged to watch for resource addresses that cause exorbitant charges as defined by exceeding a defined threshold or exceeding running average.

In some cases, rather just individual resource address being detected, a pattern may be determined that may indicate if the resource address should be considered for disabling. In some embodiments, telephone numbers having certain exchange values may be disabled. For example, a notification engine may be arranged to disable any "1-900" number (1-900-444-4444) or "1-976" number, or the like, that are known to charge back high fees when they are sent messages.

Also, in at least one of the various embodiments, the notification engine may be arranged disable telephone numbers determined to be unassociated with valid countries, exchanges, or the like. For example, telephone numbers with a country code of "81" are telephone numbers in Japan, whereas, telephone numbers with a country code of "857" may be a bad resource addresses since "857" (at this time) does not correspond to a country.

In at least one of the various embodiments, for resource addresses, such as, email addresses, URLs, or the like, one or more portions of the address may be tested for determining bad addresses. For example, URLs and/or email addresses, may include domain names as part of their address information, accordingly rules may be defined to disable/enable such resource addresses based on their domain name.

In at least one of the various embodiments, configuration information may define one or more resource addresses to expressly disable. Also, in at least one of the various embodiments, configuration information may define one or more patterns (e.g., regular expressions, or the like) that may be employed by the notification engine to identify bad resource addresses.

At block 1114, in at least one of the various embodiments, the weighting and proportional distribution information for some or all of the message providers may be updated. In at least one of the various embodiments, the values used for proportional routing of notification messages may be modified based on the current performance metrics (including cost) of the message providers. In at least one of the various embodiments, modification of the proportional weight values may take into account physical failures, such as, voltage fluctuations, power outages, circuit discontinuity, or the like, or combination thereof. Metrics employed for updating the proportional weights used to route notification messages to message providers may include metrics collected by one or more test performed by the watchdog application or end-to-end provider testing. See FIG. 6 and FIG. 9.

In at least one of the various embodiments, if one or more performance metrics of a message providers begin to drop off, or otherwise reduce, the proportional weight value for that message provider may be reduced. In at least one of the various embodiments, the change in performance metrics may be compared relative of other message providers for the same reason. Accordingly, if all message providers in a given region have similar performance changes, it may not indicate that any relative change has occurred. For example, if the quality of a communication backbone for a given region has been changes it may affect all of the message provides in that region equally—thus the proportional weights may not require modification.

In at least one of the various embodiments, as described above, the notification system may be arranged to be multi-tenant in that many separate entities (e.g., companies) may use the system to define schedules, resources, resource addresses, or the like. For example, Company A may employ the notification system to handle event messages using its own resources while Company B may employ the notification system to their event messages using their own resources. In at least one of the various embodiments, a notification engine may service event messages and provide notifications for many (thousands) different companies.

Accordingly, in at least one of the various embodiments, the metrics captured for the community of users may be employed for modifying the proportional weights for an individual users. For example, in at least one of the various embodiments, if a message provider may be failing to deliver notification messages for one company using the system, this failure information may be employed to modify the message routing for other companies. Likewise, configuration information for one company or tenant that results in improved performance or reliability may be employed to modify configuration information for other companies/tenants of the notification engine. Next, control may loop back to block 1102 for the duration of the process 1100's lifetime.

In at least one of the various embodiments, as described above, the various metrics, proportional weights, or the like, may be included in a provider profile of each message provider.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In at least one embodiment, a microcontroller may be arranged to directly execute its own embedded logic to perform actions and access its own internal memory and its own external Input and Output Interfaces (e.g., hardware pins and/or wireless transceivers) to perform actions, such as System On a Chip (SOC), or the like.

Illustrative Examples

The following are descriptions of logic that may be performed by at least one of the various embodiments. These examples further clarify one or more features of at least one of the various embodiments. These embodiments may be implemented using functions, methods, data structures, variable names, control structure, or the like, other than those described below. For example, one of ordinary skill in the art will appreciate that the innovations disclosed herein may be implemented using various programming styles, such as, functional programming, imperative programming, object-oriented programming, or the like, or combination thereof. Further, one of ordinary skill in the art will appreciate that one or more embodiments may be implemented using various computer programming languages, such as, Python, Perl, C, C++, C#. Java, Javascript, Haskell, Clojure, Ruby, Scala, custom languages, or the like, or combination thereof.

Further, in one or more embodiments (not shown in the figures), the logic illustrated in these examples may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In at least one embodiment, a microcontroller may be arranged to directly execute its own embedded logic to perform actions and access its own internal memory and its own external Input and Output Interfaces (e.g., hardware pins and/or wireless transceivers) to perform actions, such as System On a Chip (SOC), or the like. Accordingly, the below shown pseudo-code examples are included to provide clarity and/or refinement in regards to one or more of the embodiments described above.

In at least one of the various embodiments, one or more lists of regexes and their corresponding regions may be maintained. In at least one of the various embodiments, a region may map to more than one regex. For example:

ADDRESS REGEX TO REGION=[

["/+1.*/", "North America"]

["/+1415.*/", "San Francisco"],

["/+14155551212.*/", "Customer A"],

["/+44.*/", "Great Britain"]
]

In at least one of the various embodiments, each region may be mapped to a map that lists the providers that may service a region and along with their respective weights. For example:

PROVIDER_WEIGHTS={
  "North America": {"provider_1":90, "provider_2":5, "provider_3":1}
  "San Francisco": {"provider_2":50, "provider_4":20, "provider_5":1}
}

In at least one of the various embodiments, each region may be mapped to a list showing providers in descending order of reliability. Note this order might not correspond with the weights above. For example, in some embodiments, the weights may be set higher on a cheap-but-unreliable provider because a policy may be configured to try the less expensive provider first, but if it fails, the system may fallback to using priority order of the providers.

In at least one of the various embodiments, if a provider is listed for a region, it should also appear on the weighting list, and vice versa. An example of a provider list:

PROVIDERS_IN_RELIABILTY_ORDER={
  "North America": ["provider_3", "provider_1", "provider_2"],
  "San Francisco": ["provider_2", "provider_5", "provider_4"]
}

In at least one of the various embodiments, the set of all providers that have currently been disabled may be stored in a data structure, for example:

disabled_providers=(provider_1, provider_2)

In at least one of the various embodiments, a dictionary structure that contains a mapping of each provider to a list of timestamps showing recent successful and failed attempts with a given provider. For example:

{"provider_1": {"SUCCESS": [timestamp_1, timestamp_2],
  "FAIL": [timestamp_1, timestamp_2]} }, "provider_2": {"SUCCESS": [ . . . ], "FAIL": [..]}
}

In at least one of the various embodiments, another data structure may be used to contain the time at which a given address last successfully received a message, for example:

{"+14155551212": timestamp_1}

In at least one of the various embodiments, as messages may be sent to an address the address and provider statistics (provider send statistics) may be updated. The success or failure information may be provided to a bad number detection process.

In at least one of the various embodiments, if a message may be successfully sent to a particular address, that address may be considered a verified and/or reachable address. In some cases, even though the address is reachable, it may not be good enough to use and/or prefer. Nevertheless, its provider statistics may be updated based on its performance. And, the provider may be considered verified even though it may not be considered preferred.

Alternatively, if the system is unable to send to an address, it may be hard to distinguish between the address being bad or if all providers for this address failing (in spite of the address being good), hence one of the reasons for the bad number detection process. Therefore, in such cases, the providers' statistics may be updated if it is known from prior sends that the address is good.

In at least one of the various embodiments, if a message failed to send for previously a verified address, the system may record that an unexpected failure-to-send has occurred.

In at least one of the various embodiments, a send process may be arranged to send a message to an address and return a list of all providers that were tried but failed to send the message for some reason. Also, the particular provider that was used to successfully send the may be determined as well, if any.

In some embodiments, the sending process may first obtain the region for the address being sent. For example:

region=get_region_for_addr(addr)

Next, the first delivery attempt may be made. During this step, various operations for robust routing and delivery of notification messages may be performed.

In at least one of the various embodiments, the process may be arranged to trade slightly worse median and average delivery latency for better 99th percentile latencies by sometimes doing less-than-perfectly optimal things on each individual message delivery.

Also, in at least one of the various embodiments, the process may be arranged to trade slightly worse median and average delivery latency for larger savings/efficiencies in another dimension (e.g., reducing cost of delivery) without substantially impacting the 99th percentile latencies.

In at least one of the various embodiments, for the first delivery attempt, either a check of a disabled provider may be performed to see if it is back online (low probability case) or a provider may be selected randomly according to the weightings table (the normal case). One or the other is done to avoid excess delay of the delivery of any given message more than is necessary to gather stats, test our alternate routes, cost optimize, or the like. In other words, in most cases, routing messages to providers other than the most reliable provider may occur on the first attempt. Note, the number of send attempts where a non-latency optimal routing may default to one, but it may be configurable to more than one attempt per message.

In a few cases (e.g., 1%) the process may randomly determine to make the first attempt to deliver the message using a randomly selected "known bad" provider. In at least one of the various embodiments, this may occur so the process may detect if a broken/failed provider has returned to functionality. However, attempts made using known failed may be limited to avoid unnecessarily delaying messages too often by first submitting them to providers known to be down or otherwise in a failed condition.

In at least one of the various embodiments, there may be various different ways this behavior may interact with end-to-end-provider-testing (i.e. synthetic messages may be tested to test providers status, rather than relying solely on "live" user traffic). For example, in at least one of the various embodiments, a provider may be considered disabled if it is failing either end-to-end provider test or the live testing described here. In such cases, the process would not send disabled providers live traffic until end-to-end provider testing first reported the failed providers as being back online.

In at least one of the various embodiments, the common or normal case where either the message was not selected for sending to a "failed" provider, or, there are no failed providers for the region the message is for. In either case, the process may first use the random weighting algorithm. In at least one of the various embodiments, the purpose of a random weighting algorithm (rather than a strictly ordered list) may be to ensure that at least some of traffic may be funneled down all of the providers in the normal case. This may keep the provider stats up to date and helps uncover provider configuration problems (e.g., a provider has adjusted their API and it was not noticed).

In at least one of the various embodiments, the factors used to choose the weightings need not be purely based on reliability. In some embodiments, cost optimization may be the main factor when computing the weights. Or, in some cases, two or more factors may be blended together, for example, cost, average delivery time, probability the message will go through at all, get dropped, or the like.

In at least one of the various embodiments, if the message sends successfully, the process may complete; otherwise, additional steps may be taken. Also, if the message fails to be delivered, the failed provider may be added to the failed provider list.

Accordingly, in at least one of the various embodiments, subsequent delivery attempts may be performed since the message failed to send on the initial attempt. At this point, the process may be arranged to prioritize minimizing latency above all else, since some time has already been used during the first attempt to send as described above.

In at least one of the various embodiments, as mentioned above, if customer's service level agreement (SLA) allowed for it, two or more rounds of "non-latency optimal" delivery attempts may be performed. Note, different failed provider(s) may be tried on the additional non-latency optimal send attempts. For example, the process may be arranged to try another disabled provider, since the odds may be against the first provider being back online in such a short time period.

In some embodiments, if the disabled/failed providers were not getting tested enough, the probability value that a message uses a provider from the failed list may be increased. One reason to increase the probability is if failed providers were coming back online but not being timely verified as being back online.

In at least one of the various embodiments, as described above, addresses may be associated with a region. Accordingly, the process may retrieve region information based on the address where the message should be sent.

In at least one of the various embodiments, if more than one region contains the address, the most specific region may be determined. In some embodiments, the most specific region may defined as "the region that contains the address, but contains the fewest other addresses." In at least one of the various embodiments, the length of the regexes used for matching an address to a region may be employed as a proxy for determining the most specific region (e.g., best matched regions) such that the region corresponding to the longest regular expression maybe considered the most specific. One of ordinary skill in the art will appreciate that various techniques are available for determining which region to use when an address is in multiple regions. For example, pick the region whose regular expression consumed the fewest characters, via wildcard match, augment each region with a "preference" value selecting the matching region with the highest preference, or the like.

In at least one of the various embodiments, the process may be arranged to select a failed provider for the region that is associated with the address. In some embodiments, a provider may be considered failed for all of the regions it may serve. Accordingly, provider send statistics may be tracked for all of the regions served by a provider.

In other embodiments, provider statistics may be tracked on a per region basis with each region tracked independently. This would allow the provider to be marked as disabled/failed or okay on a per region basis.

In at least one of the various embodiments, the process may be arranged to pick a random failed provider applicable to the determined region. In other embodiments, the process may be arranged to track when the last time a provider was tested to ensure more fairness. Alternatively, the process may be arranged to track the number of times a provider has been tested since it was added to the disabled list and choosing the one that has been checked the least.

In at least one of the various embodiments, a process may be arranged to determine a random active (non-failed) provider of a given region. A provider may be randomly determined such that: a) a given address always maps onto the same provider (as long as the weights don't change); b) The probability of a given address string being mapped to a certain provider is proportionate to that provider's weight; c) any providers currently marked as down (failed) may be excluded.

The purpose of constraint (a) is that, while all providers for a given region are supposed to be "equivalent", there may be some minor differences that users may find annoying. For example, the speech synthesis used by different providers may be different, the caller ID may show up differently, and so on. Thus, while there may not be a guarantee that these properties are unchanging, some users may prefer that the alerting process remains unchanged unless necessary. The "randomly assign numbers to providers" approach provides the benefits of route probing while minimizing changes perceived by any one user.

In at least one of the various embodiments, an alternate implementation may dispense with providing stickiness in the mapping of an address to a provider. Accordingly, in some embodiments a random provider may be selected such that the probability that a given message (not address) is sent via a certain provider may be proportionate to that provider's weight.

In at least one of the various embodiments, PROVIDER_WEIGHTS[region] may be a hash of the form: {"provider_1":90, "provider_2":10}. The sum of all the weights, excluding down providers, may be used as the hash modulo for determining a provider. Note, in some embodiments, this hashing algorithm may be inconsistent. If the weighting of a provider (or disabling of the provider) may be changed it may cause a large proportion of the addresses to get mapped to a new provider. In some embodiments, a "consistent hashing" algorithm may be used. This way, only the addresses assigned to a provider would get remapped if a provider is disabled. Similarly, if a provider's weighting is reduced, consistent hashing algorithms allow only an equivalent proportion of the addresses assigned to that provider to be remapped.

In at least one of the various embodiments, a bad number detection process may be arranged to determine if an address is "verified" or if it is "unverified" In some embodiments, the purpose of the bad number detection process is to prevent the failure to send a message to an unverified address from: a) polluting provider success statistics (which may cause a provider to be erroneously marked as failed/disable or to have its weighting values reduced; b) setting off any "passive" internal alarms which may be arranged to observe how many delivery failures occur in a set time period.

In at least one of the various embodiments, an address may be considered as "verified" if a message has been sent to it successfully in the past seven days, and "unverified" otherwise. In at least one of the various embodiments, other implementations of this concept are possible. For example, the success ratio may be measured with an address marked as unverified if it is below a defined threshold value. Another embodiments, may be to count the number of times the system has failed to send to an address since the last successful send to that address, and mark it unverified if it exceeds a defined threshold value.

In at least one of the various embodiments, a process may be arranged to be conservative in marking an address as "verified" and aggressive at re-marking an address as "unverified" to protect the veracity of provider send statistics. In an embodiment with a reasonable number of providers, the failure to send a message to a given address on any provider should be cause to mark the address as unverified.

In at least one of the various embodiments, a process may be arranged to score how well a provider may be doing by computing its successful delivery ratio of successful message sends to message send failures. In some embodiments, a ratio score threshold, such as, 33% may be defined as a cutoff. Also, there may be a number of other scoring metrics that may be used to determine if a provider is "operating normally" or is broken.

In some embodiments, a provider may be considered as being either "good" or "bad" across all routes. In some embodiments, a scoring process may be more nuanced and can track whether a provider is as "good" on some routes but not others. Accordingly, such embodiments, may be arranged to adjust/track the recent provider activity and disabled provider data based on region and provider rather than just provider.

Also, in at least one of the various embodiments, factors beyond the provider's ability to deliver messages, such as, the cost of delivery, the delivery latency, or the like. Such factors may be used to dynamically re-compute the probability weights used in to determine a random active provider for a region.

In at least one of the various embodiments, if a provider's success ratio is below a defined threshold, that provider may be mark as disabled so it may be removed from normal use. Alternatively, in some embodiments, a process may be arranged to dynamically re-compute the provider weights so that poorly functioning providers having low success ratios may be progressively unweighted rather than sharply cut from being used to send messages.

In at least one of the various embodiments, a process may be arranged to track of how often messages fail to deliver when they are expected to be deliverable based on bad number detections algorithms, or the like. In at least one of the various embodiments, a process may be arranged to notify an administrator so they may determine the cause of the failure. Alternatively, an embodiments may be arranged to wait for a certain (small) number of occurrences to occur within a defined time window.

What is claimed as new and desired to be protected by Letters Patent of the United States is:

1. A method for employing a network computer to manage communication over a network, wherein execution of logic by one or more processors on the network computer performs actions, comprising:
generating one or more notification messages;
providing one or more responsible resources based on the one or more notification messages;
providing a plurality of message providers based on one or more resource addresses corresponding to the one or more responsible resources, wherein each of the plurality of message providers is associated with a provider profile;
providing a message provider to communicate with the one or more responsible resources based on the provider profile that is associated with each of the plurality of message providers;
providing the one or more notification messages to the message provider for communication of the one or more notification messages to the one or more responsible resources;
storing performance metrics for the plurality of message providers based on monitoring their communication of notification messages; and
updating each provider profile using the performance metrics.

2. The method of claim 1, wherein the performance metrics, further comprise, one or more of, synthetic message delivery latency, real message delivery latency, or delivery costs.

3. The method claim 1, wherein the provider profile further comprises, one or more of, one or more weight values, one or more proportional weight values, one or more performance metrics, one or more regions, delivery costs, delivery success history, or delivery error history.

4. The method of claim 1, further comprising, when the message provider fails to communicate the one or more notification messages to the one or more responsible resources, providing another message provider using a rank ordered list of the plurality of message providers, wherein the rank order list excludes each message provider that previously failed to communicate one or more other notification messages to the one or more responsible resources.

5. The method of claim 1, further comprising:
generating one or more synthetic notification messages for one or more control resources;
communicating the one or more synthetic notification messages to one or more control resources using the one or more message providers and one or more service carriers, wherein the one or more service carriers provide communication with the one or more control resources.

6. The method of claim 1, wherein providing the message provider, further comprises, comparing a portion of a message provider's provider profile and a hash code of the resource address to determine the message provider.

7. The method of claim 1, wherein determining the one or more message providers, further comprises: selecting one or more less-preferred message providers based on at least proportional weighting values, wherein the proportional weighting values ensures that each of the plurality of message providers is selected one or more times for communication of the one or more notification messages to the one or more responsible resources.

8. A system arranged for managing communication over a network, comprising: a network computer, including:
a transceiver that communicates over the network;
a memory that stores at least instructions; and
one or more processor devices, coupled to the memory, that execute instructions that perform actions, including:
generating one or more notification messages;
providing one or more responsible resources based on the one or more notification messages;
providing a plurality of message providers based on one or more resource addresses corresponding to the one or more responsible resources, wherein each of the plurality of message providers is associated with a provider profile;

providing a message provider to communicate with the one or more responsible resources based on the provider profile associated with each of the plurality of message providers;
providing the one or more notification messages to the message provider for communication of the one or more notification messages to the one or more responsible resources; storing performance metrics for the plurality of message providers based on monitoring their communication of notification messages; and
updating each provider profile using the performance metrics; and
a client computer, including:
a transceiver that communicates over the network;
a memory that stores at least instructions; and
one or more processor devices, coupled to the memory, that execute instructions that perform actions, including:
receiving the one or more notification messages communicated by the message provider.

9. The system of claim 8, wherein the performance metrics, further comprise, one or more of, synthetic message delivery latency, real message delivery latency, or delivery costs.

10. The system of claim 8, wherein the provider profile further comprises, one or more of, one or more weight values, one or more proportional weight values, one or more performance metrics, one or more regions, delivery costs, delivery success history, or delivery error history.

11. The system of claim 8, wherein the network computer processor device enables actions, further comprising, when the message provider fails to communicate the one or more notification messages to the one or more responsible resources, providing another message provider using a rank ordered list of the plurality of message providers, wherein the rank order list excludes each message provider that previously failed to communicate one or more other notification messages to the one or more responsible resources.

12. The system of claim 8, wherein the network computer processor device enables actions, further comprising:
generating one or more synthetic notification messages for one or more control resources;
communicating the one or more synthetic notification messages to one or more control resources using the one or more message providers and one or more service carriers, wherein the one or more service carriers provide communication with the one or more control resources.

13. The system of claim 8, wherein providing the message provider, further comprises, comparing a portion of a message provider's provider profile and a hash code of the resource address to determine the message provider.

14. The system of claim 8, wherein determining the one or more message providers, further comprises: selecting one or more less-preferred message providers based on at least proportional weighting values, wherein the proportional weighting values ensures that each of the plurality of message providers is selected one or more times for communication of the one or more notification messages to the one or more responsible resources.

15. A network computer that manages communication, comprising:
a transceiver that communicates over the network;
a memory that stores at least instructions; and
one or more processor devices, coupled to the memory, that execute instructions that perform actions, including: generating one or more notification messages;
providing one or more responsible resources based on the one or more notification messages;
providing a plurality of message providers based on one or more resource addresses corresponding to the one or more responsible resources, wherein each of the plurality of message providers is associated with a provider profile;
providing a message provider to communicate with the one or more responsible resources based on the provider profile that is associated with each of the plurality of message providers;
providing the one or more notification messages to the message provider for communication of the one or more notification messages to the one or more responsible resources;
storing performance metrics for the plurality of message providers based on monitoring their communication of notification messages; and
updating each provider profiler associated with the plurality of message providers based on the performance metrics.

16. The network computer of claim 15, wherein the performance metrics, further comprise, one or more of, synthetic message delivery latency, real message delivery latency, or delivery costs.

17. The network computer of claim 15, wherein the provider profile further comprises, one or more of, one or more weight values, one or more proportional weight values, one or more performance metrics, one or more regions, delivery costs, delivery success history, or delivery error history.

18. The network computer of claim 15, wherein the one or more processor devices perform actions, further comprising, when the message provider fails to communicate the one or more notification messages to the one or more responsible resources, providing another message provider using a rank ordered list of the plurality of message providers, wherein the rank order list excludes each message provider that previously failed to communicate one or more other notification messages to the one or more responsible resources.

19. The network computer of claim 15, wherein the one or more processor devices perform actions, further comprising:
generating one or more synthetic notification messages for one or more control resources;
communicating the one or more synthetic notification messages to one or more control resources using the one or more message providers and one or more service carriers, wherein the one or more service carriers provide communication with the one or more control resources.

20. The network computer of claim 15, wherein providing the message provider, further comprises, comparing a portion of a message provider's provider profile and a hash code of the resource address to determine the message provider.

21. The network computer of claim 15, wherein determining the one or more message providers, further comprises: selecting one or more less-preferred message providers based on at least proportional weighting values, wherein the proportional weighting values ensures that each of the plurality of message providers is selected one or more times for communication of the one or more notification messages to the one or more responsible resources.

22. A processor readable non-transitory storage media that includes instructions for managing communication, wherein execution of the instructions by one or more processor devices performs actions, comprising:

generating one or more notification messages;

providing one or more responsible resources based on the one or more notification messages;

providing a plurality of message providers based on one or more resource addresses corresponding to the one or more responsible resources, wherein each of the plurality of message providers is associated with a provider profile;

providing a message provider to communicate with the one or more responsible resources based on the provider profile that is associated with each of the plurality of message providers;

providing the one or more notification messages to the message provider for communication of the one or more notification messages to the one or more responsible resources;

storing performance metrics for the plurality of message providers based on monitoring their communication of notification messages; and updating each provider profile using the performance metrics.

23. The media of claim 22, wherein the performance metrics, further comprise, one or more of, synthetic message delivery latency, real message delivery latency, or delivery costs.

24. The media of claim 22, wherein the provider profile further comprises, one or more of, one or more weight values, one or more proportional weight values, one or more performance metrics, one or more regions, delivery costs, delivery success history, or delivery error history.

25. The media of claim 22, further comprising, when the message provider fails to communicate the one or more notification messages to the one or more responsible resources, providing another message provider using a rank ordered list of the plurality of message providers, wherein the rank order list excludes each message provider that previously failed to communicate one or more other notification messages to the one or more responsible resources.

26. The media of claim 22, further comprising:

generating one or more synthetic notification messages for one or more control resources;

communicating the one or more synthetic notification messages to one or more control resources using the one or more message providers and one or more service carriers, wherein the one or more service carriers provide communication with the one or more control resources.

27. The media of claim 22, wherein providing the message provider, further comprises, comparing a portion of the message provider's provider profile and a hash code of the resource address to determine the message provider.

28. The media of claim 22, wherein determining the one or more message providers, further comprises: selecting one or more less-preferred message providers based on at least proportional weighting values, wherein the proportional weighting ensures that each of the plurality of message providers is selected one or more times for communication of the one or more notification messages to the one or more responsible resources.

* * * * *

UNITED STATES PATENT AND TRADEMARK OFFICE
CERTIFICATE OF CORRECTION

| | | |
|---|---|---|
| PATENT NO. | : 9,467,970 B1 | Page 1 of 1 |
| APPLICATION NO. | : 15/154874 | |
| DATED | : October 11, 2016 | |
| INVENTOR(S) | : Kim et al. | |

It is certified that error appears in the above-identified patent and that said Letters Patent is hereby corrected as shown below:

In the Specification

In Column 6, Line 52, delete "messages (WAP)," and insert -- (WAP) messages, --, therefor.

In Column 6, Line 67, delete "manager server 114." and insert -- manager server 116. --, therefor.

In Column 7, Line 28, delete "Mobil" and insert -- Mobile --, therefor.

In Column 9, Line 22, delete "(MC)." and insert -- (NIC). --, therefor.

In Column 11, Line 22, delete "messages (WAP)," and insert -- (WAP) messages, --, therefor.

In Column 14, Line 34, delete "storage 410" and insert -- storage 310 --, therefor.

In Column 17, Line 11, delete "measured," and insert -- measured. --, therefor.

In Column 20, Line 53, delete "like" and insert -- like. --, therefor.

In Column 31, Line 17, delete "the the" and insert -- the --, therefor.

In Column 36, Line 1, delete "failback" and insert -- fallback --, therefor.

In Column 40, Line 63, delete "ADDRESS REGEX TO REGION=[" and insert -- ADDRESS_REGEX_TO_REGION=[ --, therefor.

In the Claims

In Column 46, Line 19, in Claim 3, delete "method claim" and insert -- method of claim --, therefor.

In Column 48, Line 20, in Claim 15, delete "profiler" and insert -- profile --, therefor.

Signed and Sealed this
Twelfth Day of June, 2018

Andrei Iancu
*Director of the United States Patent and Trademark Office*